(12) United States Patent
Touboul et al.

(10) Patent No.: US 11,265,199 B2
(45) Date of Patent: Mar. 1, 2022

(54) PHASE NOISE ROBUST DATA MODULATION SCHEME

(71) Applicant: QUALCOMM Incorporated, San Diego, CA (US)

(72) Inventors: Assaf Touboul, Netanya (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/901,986

(22) Filed: Jun. 15, 2020

(65) Prior Publication Data

US 2021/0392025 A1 Dec. 16, 2021

(51) Int. Cl.
*H04L 27/26* (2006.01)

(52) U.S. Cl.
CPC ...... *H04L 27/2627* (2013.01); *H04L 27/2614* (2013.01)

(58) Field of Classification Search
None
See application file for complete search history.

(56) References Cited

U.S. PATENT DOCUMENTS

| 10,547,487 B1* | 1/2020 | Zhang ................. H04L 27/3405 |
| 2004/0171366 A1* | 9/2004 | Bar-Ness ............ H04L 27/2647 |
| | | 455/278.1 |
| 2017/0331662 A1 | 11/2017 | Sun et al. |

FOREIGN PATENT DOCUMENTS

EP 2583725 B1 11/2014

OTHER PUBLICATIONS

International Search Report and Written Opinion—PCT/US2021/032546—ISA/EPO—dated Sep. 21, 2021.

* cited by examiner

*Primary Examiner* — Adolf Dsouza
(74) *Attorney, Agent, or Firm* — Holland & Hart LLP

(57) ABSTRACT

Methods, systems, and devices for wireless communications are described. In some systems, a transmitting device may identify one or more blocks of data for transmission to a receiving device. The transmitting device may map subsets of bits of the one or more blocks of data to a constellation of symbol points of a modulation order to obtain a set of symbols and may then transmit a signal including the set of symbols to a receiving device. In some systems, a receiving device may receive, from the transmitting device, the signal including the set of symbols associated with blocks of data. The receiving device may de-map the set of symbols according to a constellation of symbol points of a modulation order to obtain a plurality of sets of de-mapped data bits and decode a plurality of sets of de-mapped data bits to obtain the blocks of data.

30 Claims, 20 Drawing Sheets

PHASE NOISE ROBUST DATA MODULATION SCHEME

FIELD OF TECHNOLOGY

The following relates generally to wireless communications and more specifically to a data modulation scheme for enhanced phase noise suppression.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Communication data rates within wireless communications systems may limited by various radio frequency noise floors. In some examples, one of the dominant floors is phase noise that is caused by local oscillators at the transmitter or receiver, which can inhibit increases in modulation order within the wireless communications system.

SUMMARY

The described techniques relate to improved methods, systems, devices, and apparatuses that support a data modulation scheme for enhanced phase noise suppression. Generally, the described techniques provide for a modified orthogonal frequency-division multiplexing (OFDM) modulator that may be used to facilitate phase noise suppression as part of a data modulation scheme for enhanced phase noise suppression. The modified OFDM modulator may apply a boosting factor to at least a portion of a constellation of symbol points used for communicating data blocks. In some examples, phase noise may be suppressed at a receiver by estimating intercarrier interference (ICI) coefficients for a received signal followed by correction of the phase noise from the received signal.

A method of wireless communications at a transmitting device is described. The method may include identifying one or more blocks of data for transmission to a receiving device, mapping subsets of bits of the one or more blocks of data to a constellation of symbol points of a modulation order to obtain a set of symbols, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and transmitting a signal including the set of symbols to the receiving device.

An apparatus for wireless communications at a transmitting device is described. The apparatus may include a processor, memory coupled with the processor, and instructions stored in the memory. The instructions may be executable by the processor to cause the apparatus to identify one or more blocks of data for transmission to a receiving device, map subsets of bits of the one or more blocks of data to a constellation of symbol points of a modulation order to obtain a set of symbols, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and transmit a signal including the set of symbols to the receiving device.

Another apparatus for wireless communications at a transmitting device is described. The apparatus may include means for identifying one or more blocks of data for transmission to a receiving device, mapping subsets of bits of the one or more blocks of data to a constellation of symbol points of a modulation order to obtain a set of symbols, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and transmitting a signal including the set of symbols to the receiving device.

A non-transitory computer-readable medium storing code for wireless communications at a transmitting device is described. The code may include instructions executable by a processor to identify one or more blocks of data for transmission to a receiving device, map subsets of bits of the one or more blocks of data to a constellation of symbol points of a modulation order to obtain a set of symbols, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and transmit a signal including the set of symbols to the receiving device.

In some examples of the method, apparatuses, and non-transitory computer-readable medium described herein, a first distance between adjacent symbol points of the first subset of the symbol points may be less than a second distance between adjacent symbol points of the second subset of the symbol points, and where the first distance corresponds to a distance between symbol points of the uniform constellation of the modulation order of the first constellation power and the second distance corresponds to a distance between symbol points of the uniform constellation of the modulation order of the second constellation power.

In some examples of the method, apparatuses, and non-transitory computer-readable medium described herein, a symbol point of the second subset of the symbol points may have an in-phase component greater than symbol points of the first subset of the symbol points of a same column of the uniform constellation of the modulation order of the first constellation power and a quadrature component greater than symbol points of the first subset of the symbol points of a same row of the uniform constellation of the modulation order of the first constellation power.

In some examples of the method, apparatuses, and non-transitory computer-readable medium described herein, a column of the constellation includes a first symbol point of the first subset of the symbol points and a second symbol point of the second subset of the symbol points, the second symbol point having a greater in-phase component than the first symbol point.

In some examples of the method, apparatuses, and non-transitory computer-readable medium described herein, a row of the constellation includes a first symbol point of the first subset of the symbol points and a second symbol point of the second subset of the symbol points, the second symbol point having a greater quadrature component than the first symbol point.

In some examples of the method, apparatuses, and non-transitory computer-readable medium described herein, a first distance between adjacent symbol points of the first subset of the symbol points may be the same as a second distance between adjacent symbol points of the second subset of the symbol points.

In some examples of the method, apparatuses, and non-transitory computer-readable medium described herein, the second subset of the symbol points includes at least a portion of a set of corners of the constellation of symbol points.

Some examples of the method, apparatuses, and non-transitory computer-readable medium described herein may further include operations, features, means, or instructions for transmitting a downlink control information message including an indication of the boosting factor to the receiving device.

Some examples of the method, apparatuses, and non-transitory computer-readable medium described herein may further include operations, features, means, or instructions for identifying the boosting factor in a lookup table, where mapping the subsets of bits of the one or more blocks of data to the constellation of symbol points to transmit to the receiving device may be based on identifying the boosting factor in the lookup table.

In some examples of the method, apparatuses, and non-transitory computer-readable medium described herein, the boosting factor may be one of 1 dB, 2 dB, or 3 dB.

A method of wireless communications at a receiving device is described. The method may include receiving, from a transmitting device, a signal including a set of symbols associated with one or more blocks of data, de-mapping the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and decoding a set of sets of de-mapped data bits to obtain the one or more blocks of data.

An apparatus for wireless communications at a receiving device is described. The apparatus may include a processor, memory coupled with the processor, and instructions stored in the memory. The instructions may be executable by the processor to cause the apparatus to receive, from a transmitting device, a signal including a set of symbols associated with one or more blocks of data, de-map the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and decode a set of sets of de-mapped data bits to obtain the one or more blocks of data.

Another apparatus for wireless communications at a receiving device is described. The apparatus may include means for receiving, from a transmitting device, a signal including a set of symbols associated with one or more blocks of data, de-mapping the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and decoding a set of sets of de-mapped data bits to obtain the one or more blocks of data.

A non-transitory computer-readable medium storing code for wireless communications at a receiving device is described. The code may include instructions executable by a processor to receive, from a transmitting device, a signal including a set of symbols associated with one or more blocks of data, de-map the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and decode a set of sets of de-mapped data bits to obtain the one or more blocks of data.

Some examples of the method, apparatuses, and non-transitory computer-readable medium described herein may further include operations, features, means, or instructions for performing phase noise suppression on the received signal including the set of symbols associated with the one or more blocks of data.

In some examples of the method, apparatuses, and non-transitory computer-readable medium described herein, performing the phase noise suppression may include operations, features, means, or instructions for estimating an intercarrier interference (ICI) coefficient for each subcarrier of a set of subcarriers of the received signal, and removing at least a portion of a phase noise in the received signal based on the estimated ICI coefficient for each subcarrier of the set of subcarriers.

Some examples of the method, apparatuses, and non-transitory computer-readable medium described herein may further include operations, features, means, or instructions for performing the phase noise suppression includes iteratively performing the de-mapping and performing the phase noise suppression.

In some examples of the method, apparatuses, and non-transitory computer-readable medium described herein, a first distance between adjacent symbol points of the first subset of the symbol points may be less than a second distance between adjacent symbol points of the second subset of the symbol points, and where the first distance corresponds to a distance between symbol points of the uniform constellation of the modulation order of the first constellation power and the second distance corresponds to a distance between symbol points of the uniform constellation of the modulation order of the second constellation power.

In some examples of the method, apparatuses, and non-transitory computer-readable medium described herein, a symbol point of the second subset of the symbol points may have an in-phase component greater than symbol points of the first subset of the symbol points of a same column of the uniform constellation of the modulation order of the first constellation power and a quadrature component greater than symbol points of the first subset of the symbol points of a same row of the uniform constellation of the modulation order of the first constellation power.

In some examples of the method, apparatuses, and non-transitory computer-readable medium described herein, a column of the constellation includes a first symbol point of the first subset of the symbol points and a second symbol point of the second subset of the symbol points, the second symbol point having a greater in-phase component than the first symbol point.

In some examples of the method, apparatuses, and non-transitory computer-readable medium described herein, a row of the constellation includes a first symbol point of the first subset of the symbol points and a second symbol point of the second subset of the symbol points, the second symbol point having a greater quadrature component than the first symbol point.

In some examples of the method, apparatuses, and non-transitory computer-readable medium described herein, a first distance between adjacent symbol points of the first subset of the symbol points may be the same as a second distance between adjacent symbol points of the second subset of the symbol points.

Some examples of the method, apparatuses, and non-transitory computer-readable medium described herein may further include operations, features, means, or instructions for identifying the boosting factor in a lookup table, where de-mapping the set of symbols according to the constellation of symbol points of the modulation order to obtain the set of sets of de-mapped data bits may be based on identifying the boosting factor in the lookup table

DETAILED DESCRIPTION

Phase noise robust data modulation schemes may be supported by a wireless device. To support data modulation schemes for enhanced phase noise suppression, a transmitting device and/or a receiving device may utilize a modified orthogonal frequency division multiplexing (OFDM) modulator that enhances suppression of at least a portion of phase noise that may arise from either or both of transmission or reception of wireless signals. In some examples, applying a boosting factor to at least a portion of a constellation of symbol points used for communicating data blocks as part of a data modulation scheme for enhanced phase noise suppression may enhance suppression of phase noise in wireless communications and may increase a reliability and capability of communications performed over multiple high frequency spectrum bands.

Aspects of the disclosure are initially described in the context of wireless communications systems. Specific examples are then described of a constellation of symbol points having various power boosting factors and of a process flow for data modulation schemes for enhanced phase noise suppression. Aspects of the disclosure are further illustrated by and described with reference to apparatus diagrams, system diagrams, and flowcharts that relate to a data modulation scheme for enhanced phase noise suppression.

Figure 1:
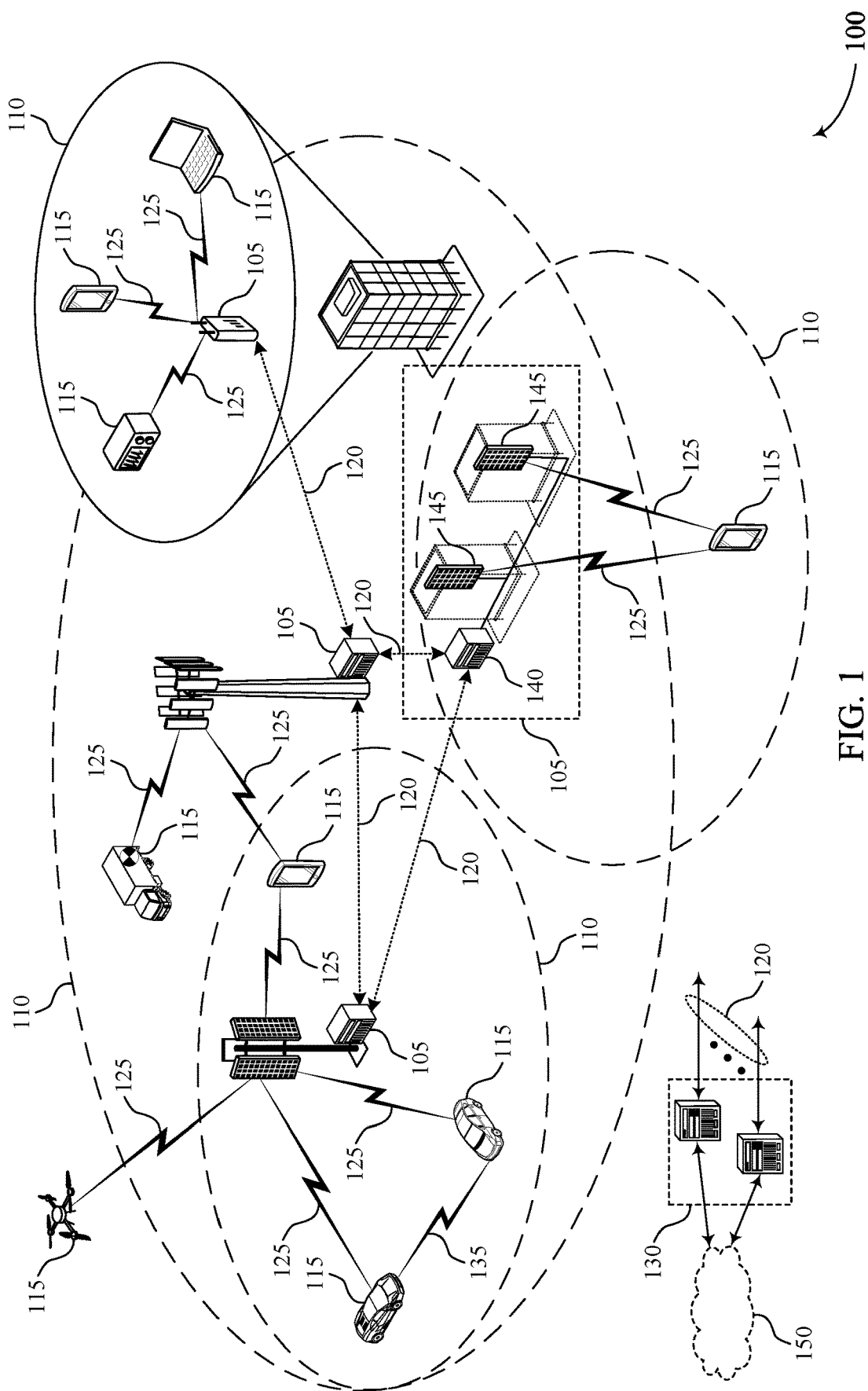
FIG. 1 illustrates an example of a system for wireless communications that supports a data modulation scheme for enhanced phase noise suppression in accordance with aspects of the present disclosure.

FIG. 1 illustrates an example of a wireless communications system 100 that supports a data modulation scheme for enhanced phase noise suppression in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples, (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A wireless communications system 100 may support multiple types of modulation techniques for conveying data between transmitting and receiving devices. Different types of modulation techniques may map logic values to different sets of modulation symbols, where each modulated symbol may be associated with a unique amplitude and/or phase. The different techniques may include coherent and/or non-coherent modulation techniques. For a coherent modulation technique, each modulated symbol may be associated with a respective amplitude and a respective phase (e.g., one of 0, 90, 180, or 270 degrees). Also, for a coherent modulation technique, a transmitting device and a receiving device may keep track of a common phase reference so that a phase determined by a receiving device for a received modulated symbol corresponds to the phase used by a transmitting device to transmit the modulated symbol. In some examples, the transmitting device and receiving device use a phase locked loop to maintain the common phase reference and to accommodate for phase drift that may occur during operation. For a non-coherent modulation technique, each modulated symbol may be associated with a respective amplitude and a "relative phase." Thus, for a non-coherent modulation technique, a transmitting device and a receiving device may not keep track of a common phase reference—e.g., because the receiving device may use a relative phase difference between consecutive modulated symbols to determine a logic value associated with a received symbol rather than an actual phase of a received modulated symbol.

Reference signals may be used to support coherent modulation. For example, a phase tracking reference signal (PTRS) may be transmitted by a transmitting device and used by a receiving device to lock onto a phase reference being used by the transmitting device. A transmitting device may transmit the PTRS over dedicated communication resources, which may increase overhead and decrease throughput for a communication. In some examples, PTRS transmissions may decrease throughput for a communication (e.g., by up to or around five percent).

Different types of modulation techniques include phase shift keying (PSK) modulation, quadrature amplitude modulation (QAM), and differential phase shift keying (DPSK) modulation. PSK modulation and QAM may be associated with coherent modulation, while DPSK modulation may be associated with non-coherent modulation. A first set of PSK modulation techniques (which may simply be referred to as PSK modulation) may be associated with a set of modulation symbols that have a same amplitude and unique phases that are distributed across a range of available phases (e.g., across a 360 degree or a radian range). The first set of PSK modulation techniques may include a binary phase shift keying (BPSK) modulation technique (which may include two modulation symbols), a QPSK modulation technique (which may include four modulation symbols), and so on. In some cases, an order of a modulation technique may be based on a number of modulation symbols supported by the modulation technique—e.g., QPSK may be a fourth-order modulation technique). Another set of PSK modulation techniques (which may be referred to as APSK modulation) may be associated with a first set of modulation symbols that have a first amplitude and unique phases and a second set of modulation symbols that have a different (e.g., larger) amplitude and unique phases. A QAM technique may be associated with a set of modulation symbols that have different amplitude and phase combinations and that are equidistant from one another. Different QAM techniques may include different quantities of modulation symbols (e.g., 4-QAM, 8-QAM, 16-QAM, 32-QAM, and so on). In some cases, 4-QAM may be equivalent to QPSK modulation.

A first set of DPSK modulation techniques (which may simply be referred to as DPSK modulation) may be associated with a set of modulation symbols that have a same amplitude and unique "relative phases" that are distributed across a range of available phases. Unlike PSK modulation, the actual phase associated with a DPSK symbol may change over time, while the relative phase (or a difference in phase) between DPSK symbols may remain constant. A DPSK modulated symbol may be represented as $x_k=x_{k-1}s_k$, k≥0, where $x_k$ refers to the kth modulated symbol, $x_{k-1}$ refers to the k−1th modulated symbol, and $s_k$ refers to the kth data symbol, assuming $x_{-1}=1$. A second set of DPSK modulation techniques (which may be referred to as DAPSK) may be associated with a first set of modulation symbols that have a first amplitude and unique relative phases that are distributed across a range of available phases and a second set of modulation symbols that have a second amplitude and unique relative phases that are distributed across the range of available phases.

For each modulation technique, the corresponding pattern of modulation symbols may be referred to as a modulation constellation. A spectral efficiency associated with a modulation constellation may be based on a distance between modulation symbols in a modulation constellation. For example, a spectral efficiency may be higher for a modulation constellation including modulation symbols that are spaced farther apart (as a function of amplitude and phase) than another modulation constellation. In some cases, a spectral efficiency associated with a PSK modulation constellation that includes modulation symbols of a single amplitude decreases as more modulation symbols are added—e.g., due to a smaller distance between modulation symbols. By contrast, a spectral efficiency associated with a QAM constellation may remain constant as more modulation symbols are added—e.g., due to a constant distance being maintained between modulation symbols.

The wireless communications system 100 may similarly support demodulation techniques for conveying data between transmitting and receiving devices. The demodulation techniques may be used to map a received set of modulated symbols to modulation symbols of a modulation constellation and to determine data values associated with the modulated symbols. Mapping the modulated symbols to the modulation constellation may involve determining an amplitude and phase of the received set of modulated symbols.

A wireless communications system 100 may support multiple modes for accessing a wireless channel, including an OFDM channel access mode (which may also be referred to as OFDMA) and an SC-FDM channel access mode (which may also be referred to SC-FDMA). A wireless device that performs transmissions according to an OFDM channel access mode may be referred to as being in an OFDM transmission mode. A wireless device that performs transmissions according to an SC-FDM channel access mode may be referred to as being in an SC-FDM transmission mode. An OFDM transmission mode may involve mapping each modulated symbol of a set of modulated symbols to unique time and frequency communication resources prior to transmission a channel. An SC-FDM transmission mode may involve spreading a set of modulated symbols across a set of frequency communication resources that occur during a same time period (e.g., a symbol period) prior to transmission over a channel. The SC-FDM transmission mode may support a localized SC-FDM transmission mode and/or a distributed SC-FDM transmission mode. A localized SC-FDM transmission mode may include mapping a set of frequency-domain symbols to a consecutive set of subcarriers, where the set of subcarriers is a subset of a larger set of subcarriers included in a carrier. A distributed SC-FDM transmission mode may include mapping a set of frequency-domain symbols to a distributed set of subcarriers, where the set of subcarriers is distributed (e.g., evenly) across a larger set of subcarriers included in a carrier. In some cases, a signal transmitted during a symbol period in accordance with an OFDM transmission mode may be referred to as an OFDM symbol. And a signal transmitted during a symbol period in accordance with an SC-FDM transmission mode may be referred to as an SC-FDM symbol.

Reference signals may be used to support OFDM and SC-FDMA transmissions. For example, a demodulation reference signal (DMRS) may be transmitted by a transmitting device and used by a receiving device for time-domain equalization. That is, the signal components of an OFDM symbol or SC-FDM symbol transmitted over different subcarriers during a symbol period may arrive at a receiving device at different times. The receiving device may use a DMRS to resolve and/or adjust for the delay between the different signal components, increasing a likelihood that an OFDM symbol or SC-FDM symbol will be successfully decoded. A transmitting device may transmit the DMRS over dedicated communication resources, which may increase overhead and decrease throughput for a communication.

A wireless communications system 100 may support communications over a wide range of frequency bands including a sub-mmW frequency band (e.g., <6 GHz), a mmW frequency band (e.g., between 6 GHz and 100 GHz), and/or a sub-Terahertz (e.g., between 100 and 300 GHz). The mmW and sub-Terahertz frequency band may be referred to as high frequency bands. In high frequency bands, a channel between a transmitting device and a receiving device may approach a single tap (or flat) channel. Thus, all, or a majority, of signal components of an OFDM symbol transmission or SC-FDM symbol transmission (e.g., the components of an OFDM or SC-FDM symbol transmitted over different subcarriers) may be received nearly simultaneously at a receiving device.

In high frequency bands, phase noise (noise associated with detecting a phase of a received modulated symbol, such as an OFDM or SC-FDMA symbol) may become large—e.g., due to the high rate of change in phase that occurs at high frequencies. To increase a performance of communications and mitigate an effect of phase noise in high frequency spectrum bands, a phase noise robust data modulation scheme may be used when the communications are performed over high frequency spectrum bands or over any other type of spectrum band. Such techniques may include iteratively estimating intercarrier interference (ICI) coefficients and correction of phase noise within a receive signal using the estimated ICI coefficients, power boosting at least a portion of a constant power constellation of symbol points, or other types of power boosting. By using data modulation schemes for enhanced phase noise suppression for communications over high frequency spectrum bands, the effects of phase noise may be reduced, increasing a reliability of communications performed over the high frequency spectrum bands.

Figure 2:
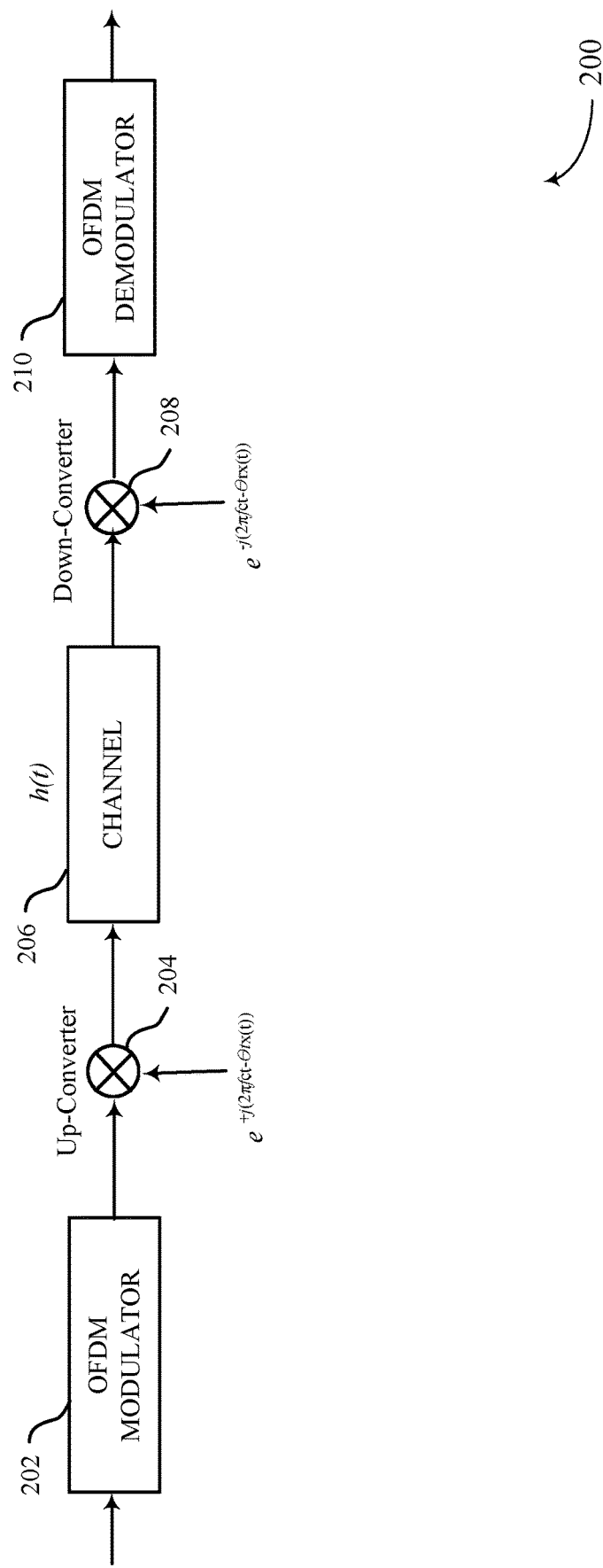
FIG. 2 illustrates an example of an orthogonal frequency-division multiplexing (OFDM) modulator that supports a data modulation scheme for enhanced phase noise suppression in accordance with aspects of the present disclosure.

FIG. 2 illustrates an example wireless communications system 200 that supports a data modulation scheme for enhanced phase noise suppression in accordance with aspects of the present disclosure. The wireless communications system 200 may include an orthogonal frequency-division multiplexing (OFDM) modulator 200, an up-converter 204, a channel 206, a down-converter 208, and an OFDM demodulator 210. In some examples, OFDM modulator 200 may implement aspects of wireless communication system 100.

As described herein, current modulation schemes in wireless communication systems, such as the wireless communication system 100, may be limited to 256-QAM as a result of RF noise floors. More specifically, one of the RF noise floors may result from phase noise introduced by local oscillators in the transmitter or receiver. It is desirable to cancel such an RF floor to yield an increase in available modulation order within the system, for example, an increase in modulation order to 1K-QAM, 4K-QAM, 16K-QAM or even 1 M-QAM. Additionally, cancellation of the RF floor may yield increased throughput within the wireless communication system.

In some cases, the OFDM modulator 200 may cooperate with the components of the wireless communication system 200 to facilitate estimation and removal of at least a portion of a total link phase noise. In such cases, the total link phase noise may be represented by Equation 1, shown below.

$$\phi(t)=\theta_{tx}(t)+\theta_{rx}(t) \quad (1)$$

Phase noise that is imposed on a signal in time division (TD) may be multiplicative. Accordingly, phase noise that is imposed on a signal in frequency division (FD) may be equivalent to cyclic convolution.

In at least some examples, phase noise suppression at a receiver as part of an OFDM modulator scheme may be performed iteratively. In such examples, estimation of ICI coefficients may be performed. Such estimation may include estimation using both pilots and hard decisions on data within the signal. In such examples, both the pilots and hard decisions on the data may be plugged into a matrix utilizing at least equations 2 and 3 shown below.

$$\hat{I} = \arg\min_{I} \|Y - M \cdot I\|^2 \quad (2)$$

$$\hat{I} = func(Y, M) = (M^H M)^{-1} M^H \cdot Y \quad (3)$$

Following use of equations 2 and 3, correction of the phase noise from the received signal may be performed on the data using equation 4 shown below.

$$Y_{ICI.clean} = (Y - M_1 \hat{I}_{ICI}) \hat{I}_0 = H \cdot \hat{X} + \tilde{N} \quad (4)$$

Once correction of the phase noise from the received signal has been performed, phase noise estimation algorithms may be used to estimate the ICI coefficients according to the following equation, equation 5.

$$\{I_k\}_{k=0}^{N-1} \quad (5)$$

Higher symbol power, as represented below by equation 6, may facilitate improving a ratio of ICI to noise within the signal. Accordingly, ICI estimation improves as a number of power-boosted symbols is increased. In such examples, ICI estimation accuracy is improved, which may cause improved phase noise suppression. Such an estimation may be performed for both pilots and hard decision on the data, providing motivation for boosting a power of one or more of the data symbols.

$$|X_k|^2 \quad (6)$$

In such cases, the iterative process may include channel estimation, phase noise estimation, phase noise correction over DMRS, and a repetition of the preceding steps until a desired reduction in phase noise is accomplished. Such a process may be performed a plurality of times, or until the desired phase noise reduction is achieved.

In some examples, as part of the iterative process, and without feedback from the first stage of the process described above, hard decisions may be performed on the data portion of the signal in question. Additionally, phase noise estimation and phase noise correction may follow the hard decision portion of the iterative process, with the entire process being repeated for one or more iterations until the desired reduction in phase noise is achieved.

In such cases, phase noise estimation algorithms may be used to estimate the ICI coefficients. In some examples, a relatively higher symbol power may improve a ratio of ICI to noise, for example, a symbol power that is boosted relative to a symbol power of additional symbols of a constellation.

Figure 3A:
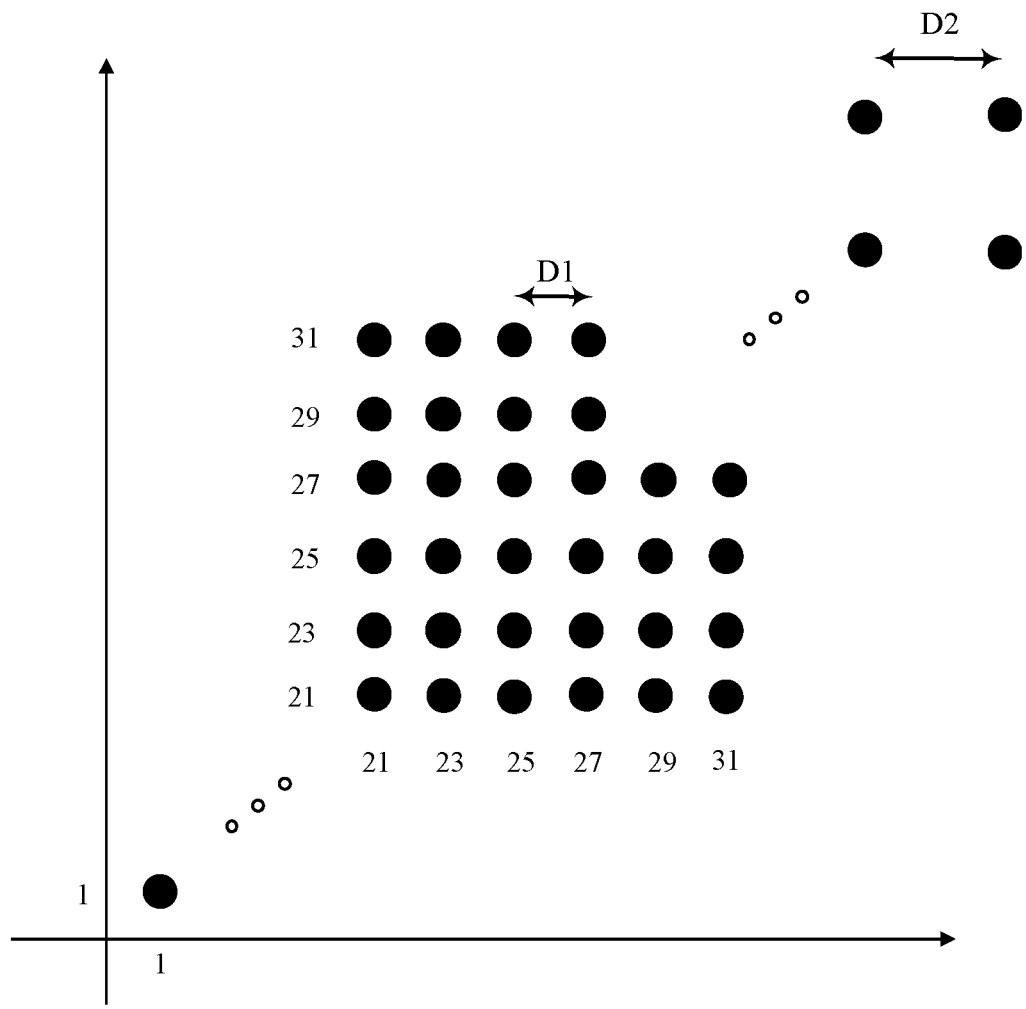
FIG. 3A illustrates an example of a constellation of symbol points of a modulation order of a first power that supports a data modulation scheme for enhanced phase noise suppression in accordance with aspects of the present disclosure.

FIG. 3A illustrates an example of a constellation of symbol points 300 that supports a data modulation scheme for enhanced phase noise suppression in accordance with aspects of the present disclosure. In some examples, constellation of symbol points 300 may implement aspects of wireless communication system 100. In the example shown in FIG. 3A, the constellation of symbol points 300 is a 1K-QAM constellation of symbol points, and FIG. 3A illustrates a corner of the constellation of symbol points. The corner of the constellation of symbol points includes 36 symbol points in an upper corner of rows and columns of the constellation, with 4 symbol points illustrated as having been boosted by 3 db. In the example 1K-QAM constellation, each of the four corners of the constellation may also have boosted symbol points.

In this example, the power boost of 3 dB is applied to the four symbol points of the corner (e.g., 29+29i, 31+29i, 29+31i, 31+31i). In this example, a Euclidean distance between the boosted symbols (D2) is equal to a Euclidean distance between the non-boosted symbols (D1) multiplied by the square root of two, and power boosting the four symbols of the corner of the constellation illustrated in FIG. 3A causes a total constellation power to grow by 0.2 dB.

In order to maintain a constant power of the illustrated constellation, the whole constellation may have a power boost factor applied that causes the constellation to shrink by 0.2 dB in total. The resulting constellation of symbol points includes a D1 and D2 spacing that is reduced by 0.2 dB. However, the four symbol points of the corner of the constellation that were power boosted are still separated by a larger spacing D2 than before they were power boosted and are benefiting from a total gain of 2.8 dB. The signal-to-noise ratio (SNR) penalty benefits from an increased Euclidean distance (D2) from each of the other symbol points and the remaining symbol points of the constellation as compared to the Euclidean distance (D1) present between each of the symbol points that have not been power boosted. The resulting penalty is bounded to less than 0.2 dB. In some examples, any portion of the constellation of symbol points 300 may have a power boosting factor applied and any portion number of symbol points may be power boosted to increase a spacing between each of the symbol points that is power boosted.

Figure 3B:
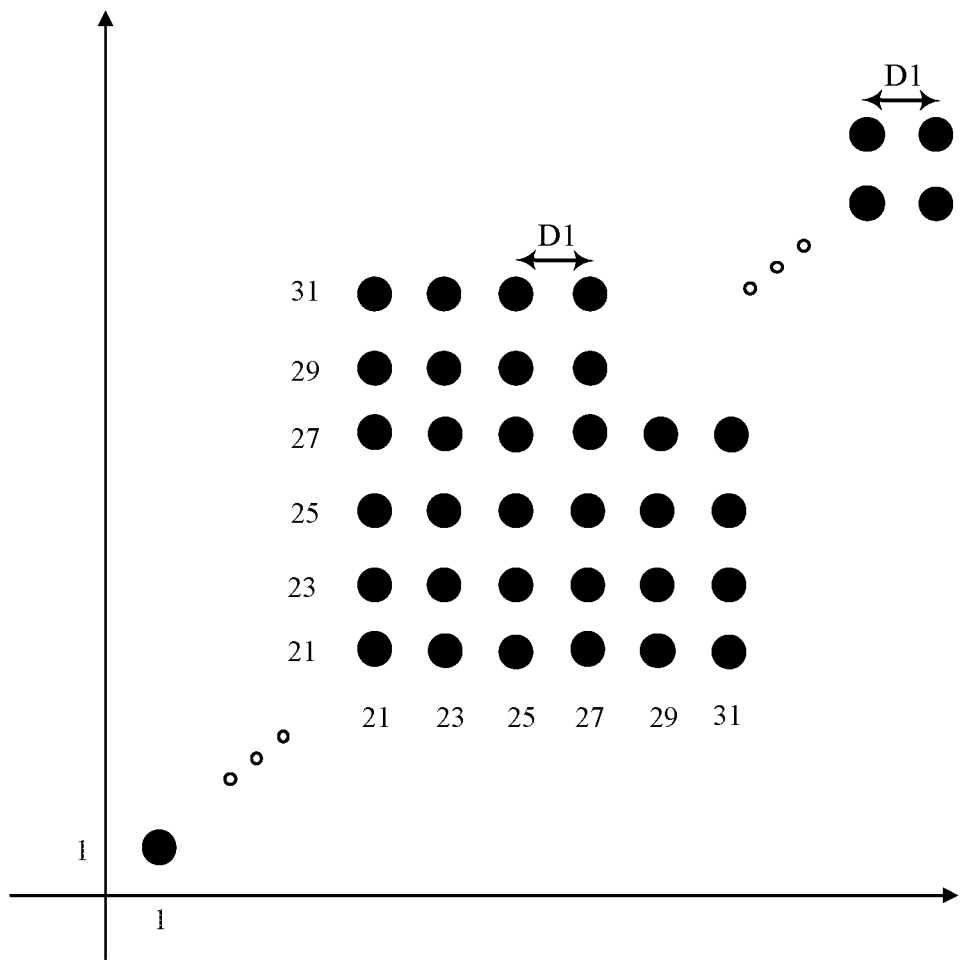
FIG. 3B illustrates an example of a constellation of symbol points of the modulation order illustrated in FIG. 3A of a second power that supports a data modulation scheme for enhanced phase noise suppression in accordance with aspects of the present disclosure.

FIG. 3B illustrates an example of a constellation of symbol points 301 that support a data modulation scheme for enhanced phase noise suppression in accordance with aspects of the present disclosure. In some examples, constellation of symbol points 301 may be implemented by aspects of wireless communication system 100. In the example shown in FIG. 3B, the constellation of symbol points 301 is a 1K-QAM constellation of symbol points illustrating an application of a power boosting factor that preserves a spacing distance D1 between each of the symbol points of the constellation of symbol points 301, but that shifts the four corner points by a shift value.

In this example, the four corner symbol points, 29+29i, 31+29i, 29+31i, and 31+31i are shifted to have higher in-phase and quadrature components relative to the other symbol points of constellation of symbol points 301 by the power boosting shift factor, yielding a lower SNR penalty than the power boosted constellation shown in FIG. 3A. In some examples, any portion of the constellation of symbol points may have a power boosting factor applied and any number of the constellation of symbol points may be shifted in any direction that facilitates operation of the wireless system associated with the constellation of symbol points 301 as described herein.

Figure 4:
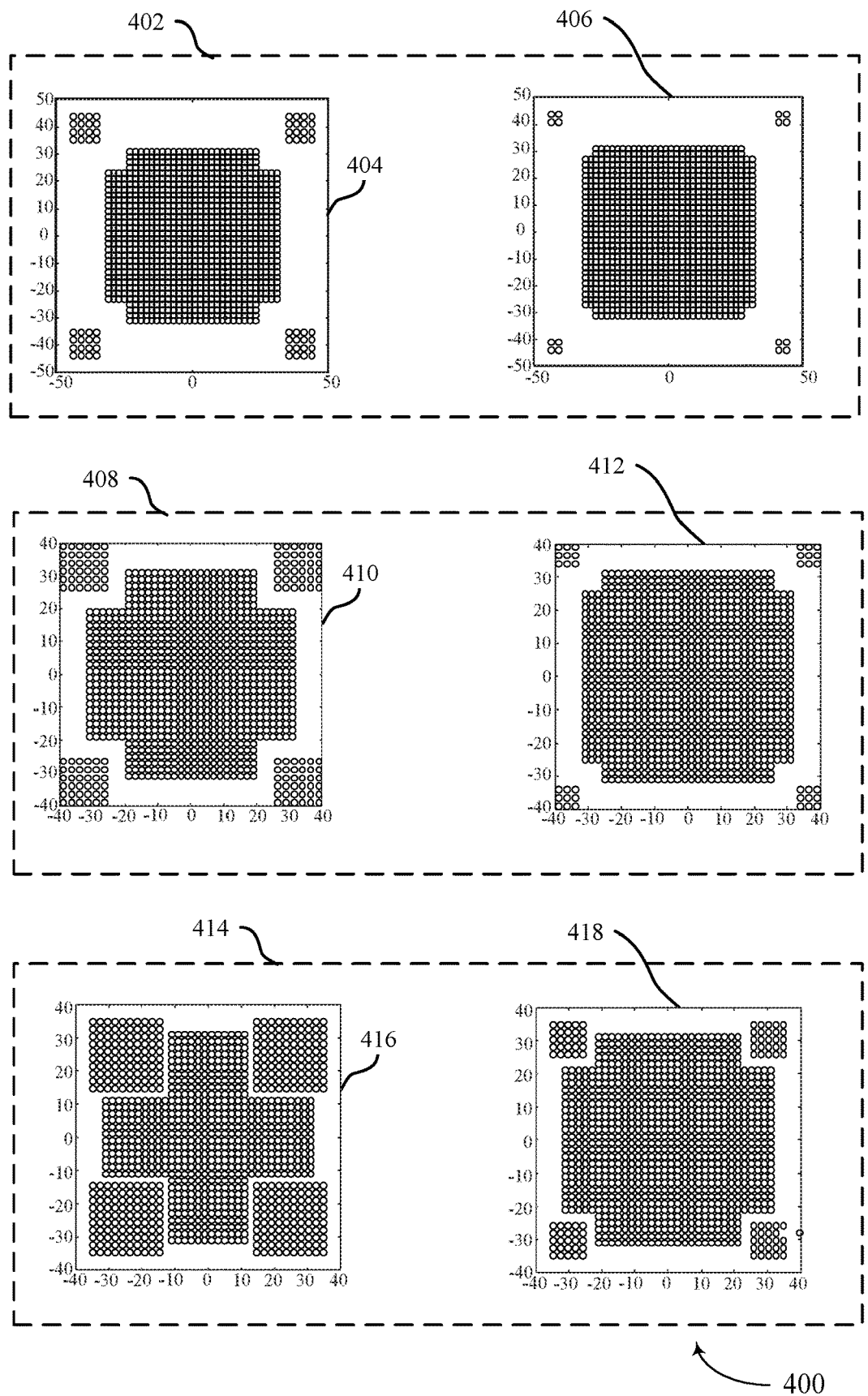
FIG. 4 illustrates an example of 1024 quadrature amplitude modulation (1-QAM) constellations of symbol points having a portion of the constellation points power boosted that support a data modulation scheme for enhanced phase noise suppression in accordance with aspects of the present disclosure.

FIG. 4 illustrates an example of 1K-QAM constellations of symbol points 400 having at least a portion of the constellation symbol points that are power boosted to support a data modulation scheme for enhanced phase noise suppression in accordance with aspects of the present disclosure. In some examples, the 1K-QAM constellations of symbol points 400 may implement aspects of wireless communication system 100. Additionally, in some examples, any portion of the 1K-QAM constellations of symbol points 400 may be power boosted.

In this example, the group 402 of the constellations of symbol points 404 and 406 is illustrated as having a power boosting factor of 3 dB applied to the corner of the constellations of symbol points 404 and 406. Specifically, four corners of the constellation of symbol points 404, each corner including sixteen symbol points, are power boosted by 3 dB resulting in a 1-QAM SNR penalty of less than 0.6 dB. Four corners of the constellation of symbol points 406, each corner including four symbol points, are also illustrated as being power boosted by 3 dB, resulting in a 1-QAM SNR penalty of less than 0.2 dB.

The group 408 of the constellations of symbol points 410 and 412 is illustrated as having a power boosting factor of 2 dB applied to the corners of the constellations of symbol points 410 and 412. Specifically, four corners of the constellation of symbol points 410, each corner including thirty six symbol points, are power boosted by 2 dB, resulting in a 1-QAM SNR penalty of less than 0.6 dB. Additionally, four corners of the constellation of symbol points 412, each corner including nine symbol points, are illustrated as being power boosted by 2 dB, resulting in a 1-QAM SNR penalty of less than 0.2 dB.

The group 414 of the constellations of symbol points 416 and 418 is illustrated as having a power boosting factor of 1 dB applied to the corners of the constellations of symbol points 416 and 418. Specifically, four corners of the constellation of symbol points 416, each corner including one hundred symbol points, are illustrated as being power boosted by 1 dB, resulting in a 1-QAM SNR penalty of less than 0.6 dB. Additionally, four corners of the constellation of symbol points 418, each corner including twenty five symbol points, are illustrated as being power boosted by 1 dB, resulting in a 1-QAM SNR penalty of less than 0.2 dB.

Figure 5:
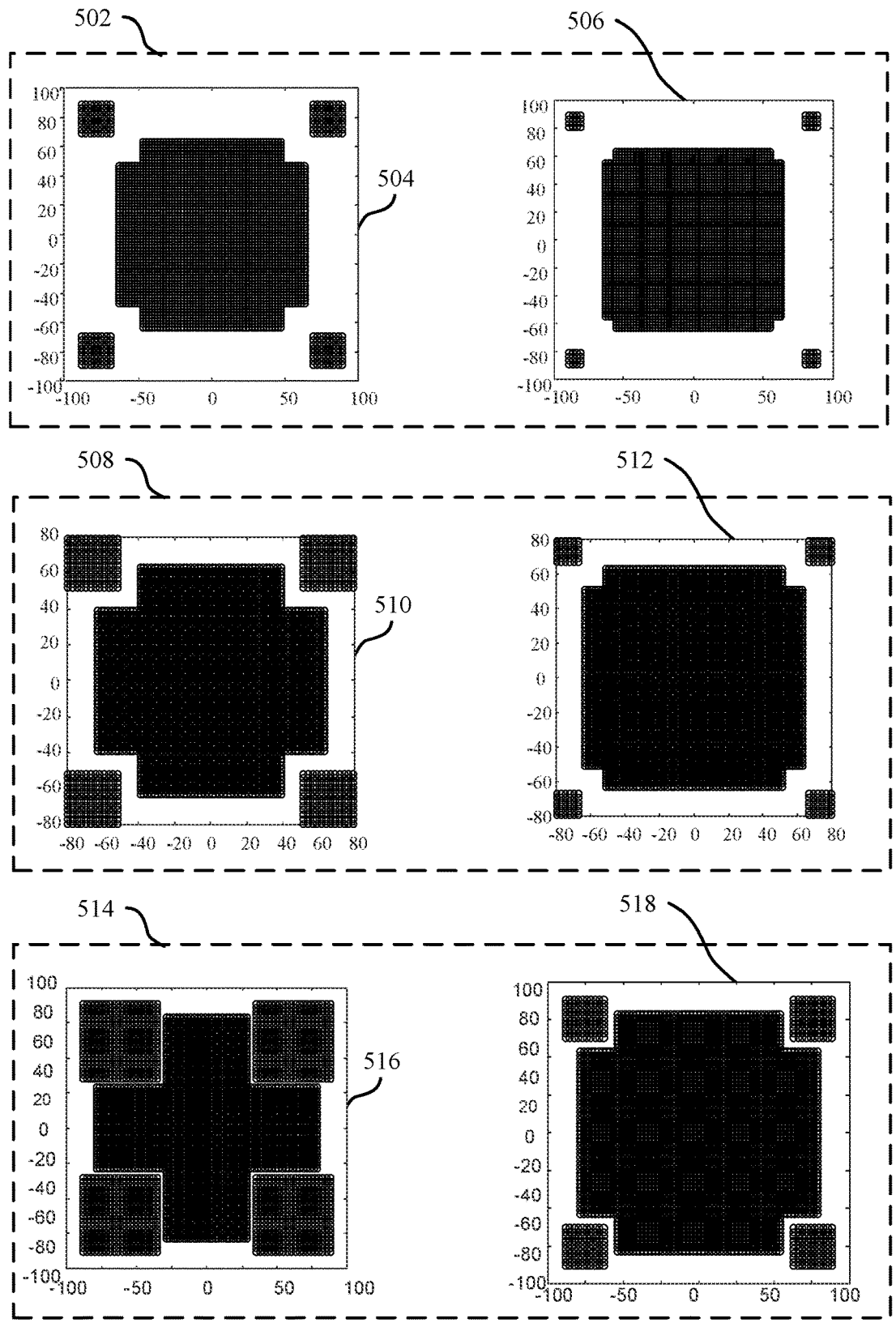
FIG. 5 illustrates an example of 4096 quadrature amplitude modulation (4-QAM) constellations of symbol points having a portion of the constellation points power boosted that support a data modulation scheme for enhanced phase noise suppression in accordance with aspects of the present disclosure.

FIG. 5 illustrates an example of a 4K-QAM constellations of symbol points 500 that supports a data modulation scheme for enhanced phase noise suppression in accordance with aspects of the present disclosure. In some examples, the constellations of symbol points 500 may be implemented by aspects of wireless communication system 100. Additionally, in some examples, any portion of the constellations of symbol points 500 may be power boosted.

In this example, the group 502 of the constellations of symbol points 504 and 506 is illustrated as having a power boosting factor of 3 dB applied to the corner of each of the constellations of symbol points 504 and 506. Specifically, four corners of the constellation of symbol points 504, each corner including sixty four symbol points, are power boosted by 3 dB resulting in a 4-QAM SNR penalty of less than 0.6 dB. Four corners of the constellation of symbol points 506, each corner including sixteen symbol points, are also illustrated as being power boosted by 3 dB, resulting in a 4-QAM SNR penalty of less than 0.2 dB.

The group 508 of the constellations of symbol points 510 and 512 is illustrated as having a power boosting factor of 2 dB applied to the corners of the constellations of symbol points 510 and 512. Specifically, four corners of the constellation of symbol points 510, each corner including one hundred and forty four symbol points, are power boosted by 2 dB, resulting in a 4-QAM SNR penalty of less than 0.6 dB. Additionally, four corners of the constellation of symbol points 512, each corner including nine symbol points, are illustrated as being power boosted by 2 dB, resulting in a 4-QAM SNR penalty of less than 0.2 dB.

The group 514 of the constellations of symbol points 516 and 518 is illustrated as having a power boosting factor of 1 dB applied to the corners of the constellations of symbol points 516 and 518. Specifically, four corners of the constellation of symbol points 516, each corner including four hundred symbol points, are illustrated as being power boosted by 1 dB, resulting in a 1-QAM SNR penalty of less than 0.6 dB. Additionally, four corners of the constellation of symbol points 518, each corner including one hundred symbol points, are illustrated as being power boosted by 1 dB, resulting in a 1-QAM SNR penalty of less than 0.2 dB.

Groups 402, 408, 414, 502, 508, and 514 illustrate example boosting for a constellation for enhanced phase noise suppression, and other power boosting factors may be applied with different numbers or arrangements of constellation points. For example, any desired boosting factor may be applied, and any number of constellation points may be boosted for a given boosting factor. In some examples, the set of constellation points boosted in each corner may have equal dimensions of rows and columns (e.g., a square group of symbol points including 1, 4, 9, 16, and the like numbers of symbol points), or the set may have a different number of rows and columns, or other shapes such as a triangle of symbol points.

Figure 6:
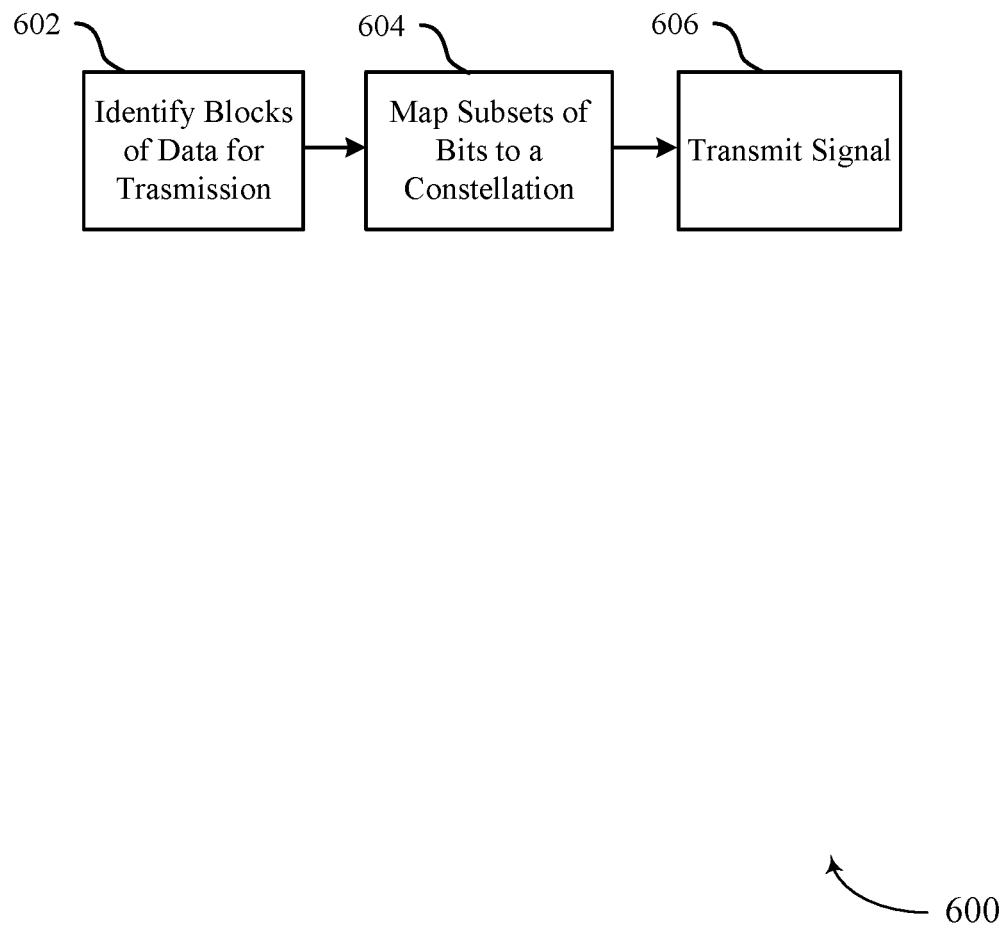
FIG. 6 illustrates an example of a data modulation scheme for enhanced phase noise suppression transmitter process flow that supports a data modulation scheme for enhanced phase noise suppression in accordance with aspects of the present disclosure.

FIG. 6 illustrates an example of a transmitter process flow 600 that supports a data modulation scheme for enhanced phase noise suppression in accordance with aspects of the present disclosure. Process flow 600 may be implemented by aspects of wireless communication system 100 including UEs 115 or base stations 105.

In some examples, process flow 600 illustrates an exemplary sequence of operations performed to support phase noise robust data modulation at a transmitting device. For example, process flow 600 depicts identifying, mapping, and transmitting data in support of phase noise robust data modulation at a transmitting device. One skilled in the art would understand that one or more of the operations described in process flow 600 may be performed earlier or later in the process, omitted, replaced, supplemented, or any combination thereof. Also, additional operations described herein that are not included in process flow 600 may be included. In some examples, process flow 600 may be performed by a transmitting device such as a UE or a base station based on whether a UE or a base station is responsible for the transmitting.

At 604, the transmitting device may identify one or more blocks of data from data available to the transmitting device for transmission to a receiving device.

At 606, the transmitting device may map subsets of bits of the one more blocks of data to a constellation of symbol points of a modulation order to obtain a set of symbols. In such cases, the locations of a first subset of the symbol points may correspond to locations of a uniform constellation of the modulation order of a first constellation power. Additionally, locations of a second subset of the symbol points may correspond to locations of a uniform constellation of the modulation order of a second constellation power and the second constellation power may be determined by applying a boosting factor to the first constellation power.

In some cases, a distance between adjacent symbol points of the first subset of the symbol points may be less than a second distance between adjacent symbol points of the second subset of the symbol points. In such cases, the first distance may correspond to a distance between symbol points of the uniform constellation of the modulation order of the first constellation power and the second distance may correspond to a distance between symbol points of the uniform constellation of the modulation order of the second constellation power.

In some examples, a symbol point of the second subset of the symbol points may have an in-phase component that is greater than symbol points of the first subset of the symbol points of a same column of the uniform constellation of the modulation order of the first constellation power. In such examples, a quadrature component may be greater than symbol points of the first subset of the symbol points of a same row of the uniform constellation of the modulation order of the first constellation power In some examples, a column of the constellation of symbol points may include a first symbol point of the first subset of the symbol points and a second symbol point of the second subset of the symbol points. The second symbol point having a greater in-phase component than the first symbol point. In additional examples, a first distance between adjacent symbol points of the first subset of the symbol points may be the same as a second distance between adjacent symbol points of the second subset of the symbol points. In further examples, the second subset of the symbol points may include at least a portion of a plurality of corners of the constellation of symbol points.

At 608, the transmitting device may transmit a signal including the set of symbols to the receiving device. In some cases, the transmitting device may transmit a downlink control information message including an indication of the boosting factor to the receiving device. In other cases, the transmitting device may identify the boosting factor in a lookup table. In such cases, mapping the subsets of bits of the one or more blocks of data to the constellation of symbol points to transmit to the receive device may be based at least in part on identifying the boosting factor in the lookup table. In some cases, the boosting factor may be one of 1 dB, 2 dB, or 3 dB.

Figure 7:
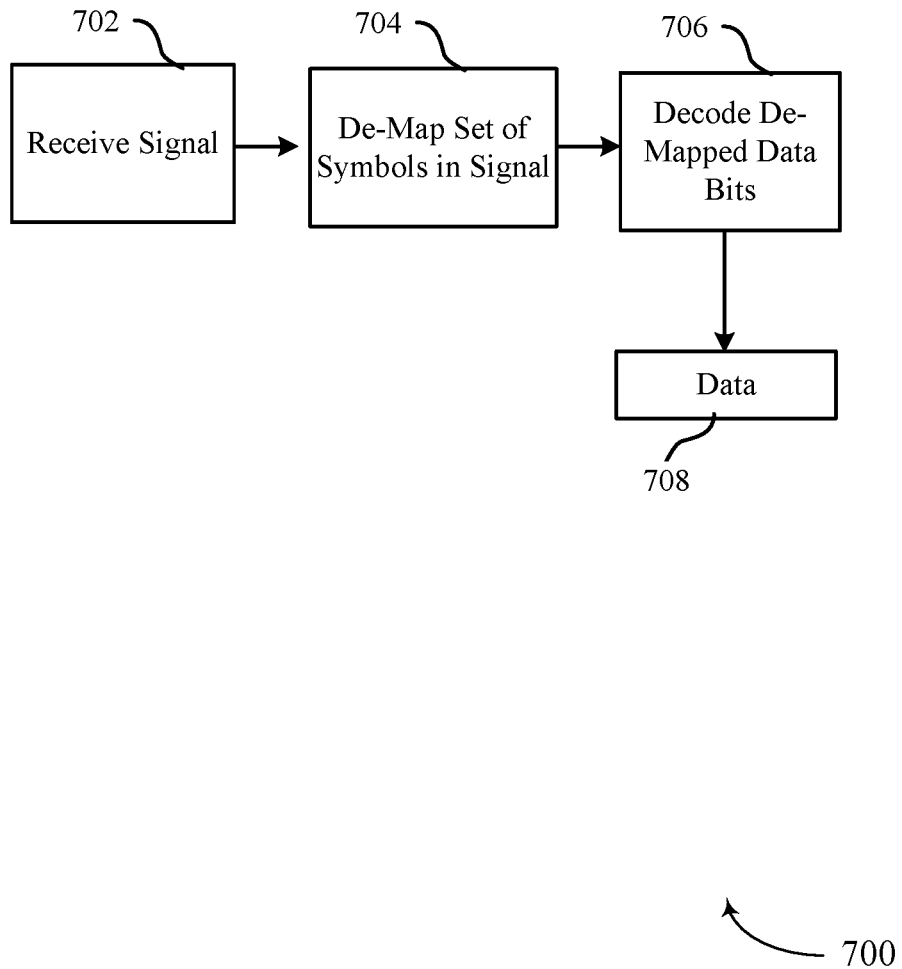
FIG. 7 illustrates an example of a data modulation scheme for enhanced phase noise suppression base station process flow that supports a data modulation scheme for enhanced phase noise suppression in accordance with aspects of the present disclosure.

FIG. 7 illustrates an example of a data modulation scheme for enhanced phase noise suppression base station process flow 700 that supports a data modulation scheme for enhanced phase noise suppression in accordance with aspects of the present disclosure.

In some examples, process flow 700 illustrates an exemplary sequence of operations performed to support phase noise robust data modulation at a receiving device. For example, process flow 700 depicts receiving, de-mapping, and decoding data in support of phase noise robust data modulation at a receiving device. One skilled in the art would understand that one or more of the operations described in process flow 700 may be performed earlier or later in the process, omitted, replaced, supplemented, or any combination thereof. Also, additional operations described herein that are not included in process flow 700 may be performed by a receiving device such as a UE or a base station based on whether a UE or a base station is responsible for the receiving.

At 702, the receiving device may receive a signal from a transmitting device. In this example, the signal may include a set of symbols associated with one or more blocks of data.

At 704, the receiving device may de-map the set of received symbols according to a constellation of symbol points of a modulation order to obtain a plurality of sets of de-mapped data bits. In this example, the locations of a first subset of the symbol points may correspond to locations of a uniform constellation of the modulation order of a first constellation power and locations of a second subset of the symbol points may correspond to locations of a uniform constellation of the modulation order of a second constellation power. In such cases, the second constellation power may be determined by applying a boosting factor to the first constellation power.

At 706, the receiving device may decode a plurality of de-mapped data bits to obtain the one or more blocks of data. At 708 the receiving device may process the obtained one or more blocks of data.

In some cases, the receiving device may perform phase noise suppression on the received signal including the set of symbols that are associated with the one or more blocks of data. In such cases, performing the phase noise suppression may include estimating an intercarrier interference (ICI) coefficient for each subcarrier of a plurality of subcarriers of the received signal. Additionally, performing the phase noise suppression may further include removing at least a portion of a phase noise in the received signal based at least in part on the estimated ICI coefficient for each subcarrier of the plurality of subcarriers. In at least some cases such cases, the phase noise suppression may include iteratively performing the de-mapping and performing the phase noise suppression.

Figure 8:
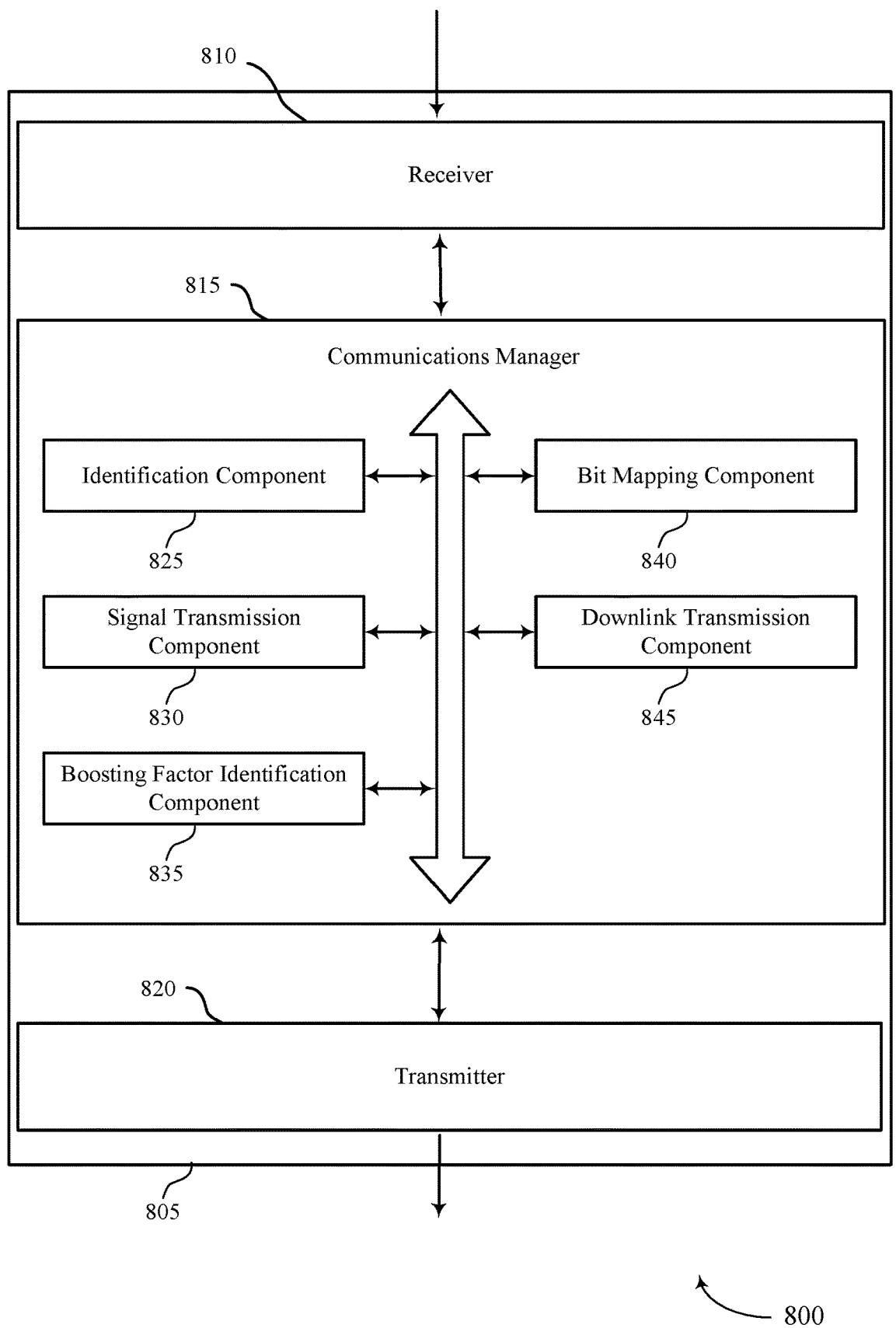
FIG. 8 shows a block diagram of a device that supports a data modulation scheme for enhanced phase noise suppression in accordance with aspects of the present disclosure.

FIG. 8 shows a block diagram 800 of a device 805 that supports a data modulation scheme for enhanced phase noise suppression in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to a data modulation scheme for enhanced phase noise suppression, etc.). Information may be passed on to other components of the device 805. The receiver 810 may be an example of aspects of the transceiver 920 described with reference to FIG. 9. The receiver 810 may utilize a single antenna or a set of antennas.

The communications manager 815 may identify one or more blocks of data for transmission to a receiving device, map subsets of bits of the one or more blocks of data to a constellation of symbol points of a modulation order to obtain a set of symbols, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and transmit a signal including the set of symbols to the receiving device. The communications manager 815 may be an example of aspects of the communications manager 910 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processing (DSP), an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 920 described with reference to FIG. 9. The transmitter 820 may utilize a single antenna or a set of antennas.

The communications manager 815 may include an identification component 825, a bit mapping component 840, a signal transmission component 830, a downlink transmission component 845, and a boosting factor identification component 835. Each of these modules may communicate, directly or indirectly, with one another (e.g., via one or more buses).

The identification component 825 may identify one or more blocks of data for transmission to a receiving device.

The bit mapping component 840 may map subsets of bits of the one or more blocks of data to a constellation of symbol points of a modulation order to obtain a set of symbols, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power.

In some cases, a first distance between adjacent symbol points of the first subset of the symbol points is less than a second distance between adjacent symbol points of the second subset of the symbol points, and where the first distance corresponds to a distance between symbol points of the uniform constellation of the modulation order of the first constellation power and the second distance corresponds to a distance between symbol points of the uniform constellation of the modulation order of the second constellation power.

In some cases, a symbol point of the second subset of the symbol points has an in-phase component greater than symbol points of the first subset of the symbol points of a same column of the uniform constellation of the modulation order of the first constellation power and a quadrature component greater than symbol points of the first subset of the symbol points of a same row of the uniform constellation of the modulation order of the first constellation power.

In some cases, a column of the constellation includes a first symbol point of the first subset of the symbol points and a second symbol point of the second subset of the symbol points, the second symbol point having a greater in-phase component than the first symbol point.

In some cases, a row of the constellation includes a first symbol point of the first subset of the symbol points and a second symbol point of the second subset of the symbol points, the second symbol point having a greater quadrature component than the first symbol point.

In some cases, a first distance between adjacent symbol points of the first subset of the symbol points is the same as a second distance between adjacent symbol points of the second subset of the symbol points.

In some cases, the second subset of the symbol points includes at least a portion of a set of corners of the constellation of symbol points.

The signal transmission component 830 may transmit a signal including the set of symbols to the receiving device.

The downlink transmission component 845 may transmit a downlink control information message including an indication of the boosting factor to the receiving device.

The boosting factor identification component 835 may identify the boosting factor in a lookup table, where mapping the subsets of bits of the one or more blocks of data to the constellation of symbol points to transmit to the receiving device is based on identifying the boosting factor in the lookup table.

In some cases, the boosting factor is one of 1 dB, 2 dB, or 3 dB.

Figure 9:
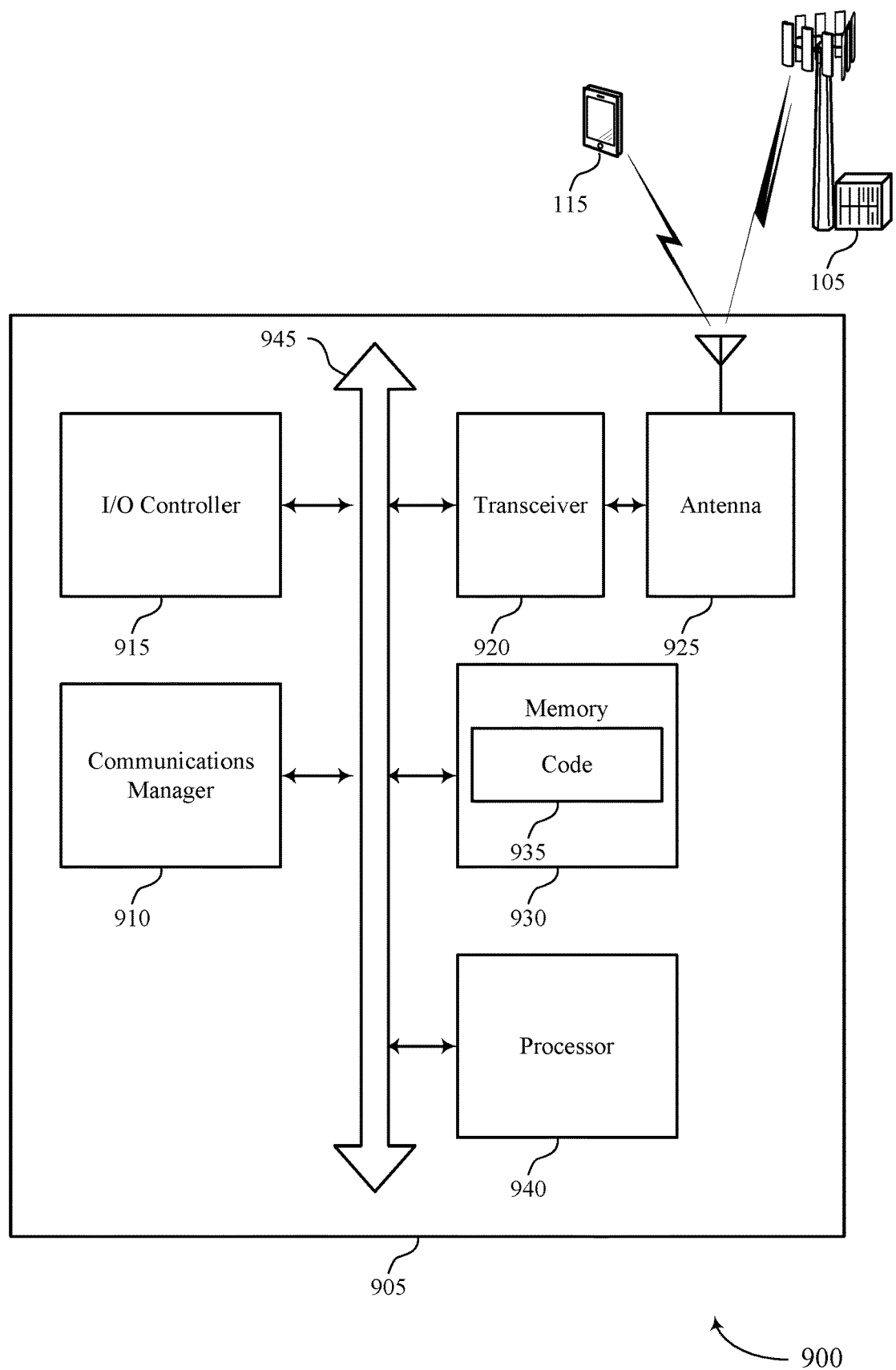
FIG. 9 shows a diagram of a system including a device that supports a data modulation scheme for enhanced phase noise suppression in accordance with aspects of the present disclosure.

FIG. 9 shows a diagram of a system 900 including a device 905 that supports a data modulation scheme for enhanced phase noise suppression in accordance with aspects of the present disclosure. The device 905 may be an example of or include the components of device 805, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify one or more blocks of data for transmission to a receiving device, map subsets of bits of the one or more blocks of data to a constellation of symbol points of a modulation order to obtain a set of symbols, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and transmit a signal including the set of symbols to the receiving device.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting a data modulation scheme for enhanced phase noise suppression).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
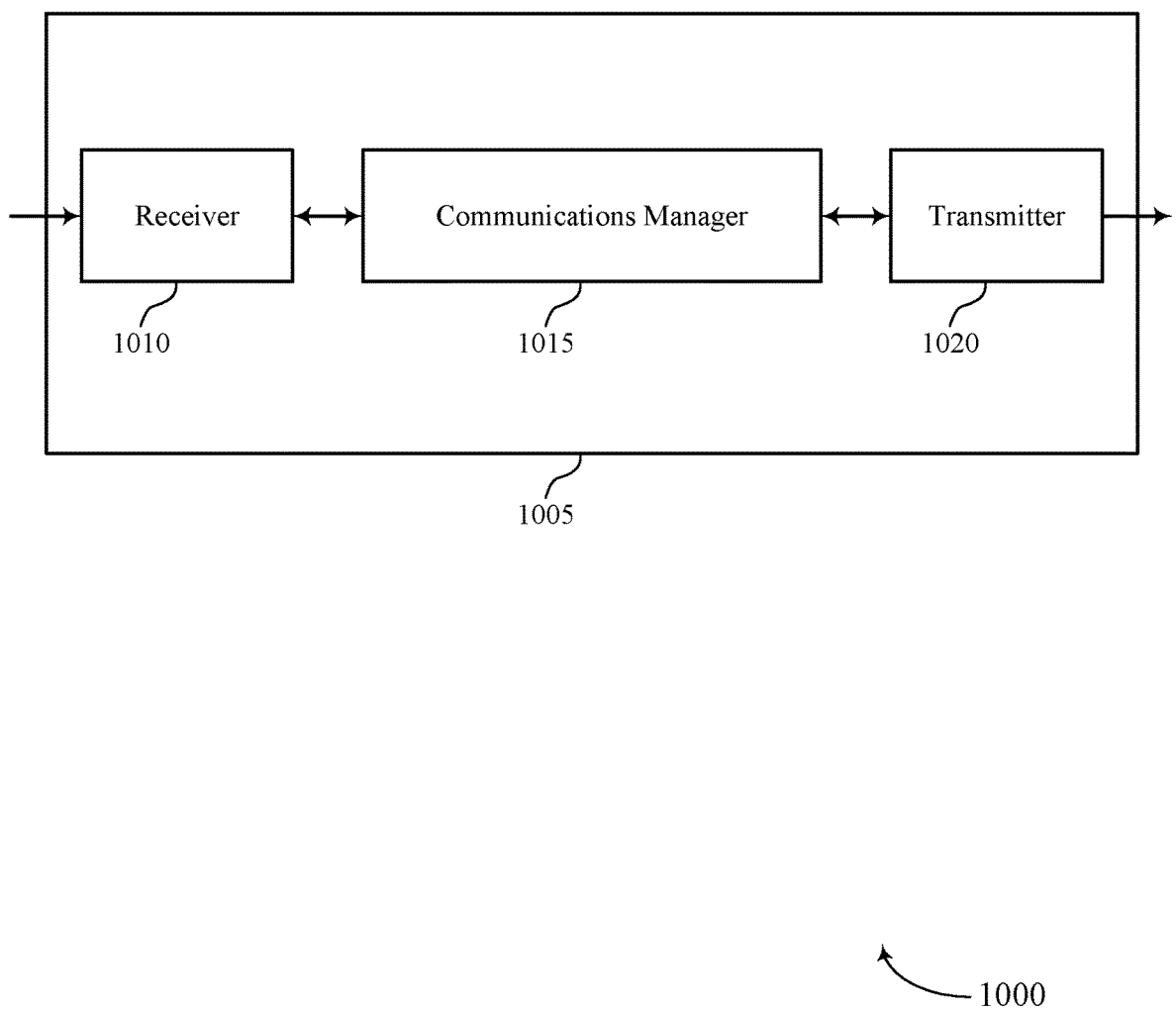
FIGS. 10 and 11 show block diagrams of devices that support data modulation schemes for enhanced phase noise suppression in accordance with aspects of the present disclosure.

FIG. 10 shows a block diagram 1000 of a device 1005 that supports a data modulation scheme for enhanced phase noise suppression in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to a data modulation scheme for enhanced phase noise suppression, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may receive, from a transmitting device, a signal including a set of symbols associated with one or more blocks of data, de-map the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and decode a set of sets of de-mapped data bits to obtain the one or more blocks of data. The communications manager 1015 may be an example of aspects of the communications manager 1210 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1220 described with reference to FIG. 12. The transmitter 1020 may utilize a single antenna or a set of antennas.

Figure 11:
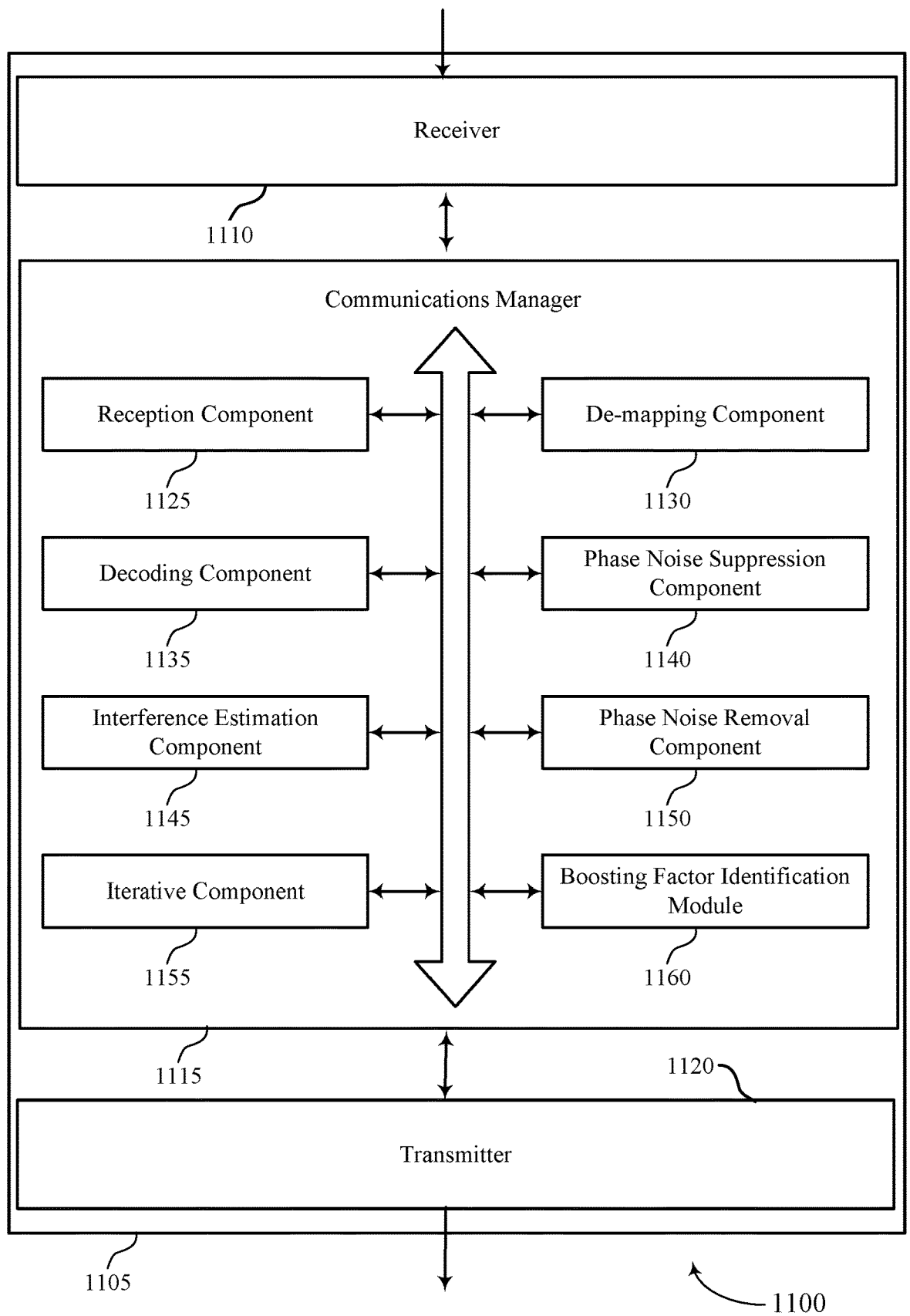

FIG. 11 shows a block diagram 1100 of a device 1105 that supports a data modulation scheme for enhanced phase noise suppression in accordance with aspects of the present disclosure. The device 1105 may be an example of aspects of a device 1005, or a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to a data modulation scheme for enhanced phase noise suppression, etc.). Information may be passed on to other components of the device 1105. The receiver 1110 may be an example of aspects of the transceiver 1220 described with reference to FIG. 12. The receiver 1110 may utilize a single antenna or a set of antennas.

The communications manager 1115 may be an example of aspects of the communications manager 1015 as described herein. The communications manager 1115 may be an example of aspects of the communications manager 1210 described herein.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1220 described with reference to FIG. 12. The transmitter 1120 may utilize a single antenna or a set of antennas.

The communications manager 1115 may include a reception component 1125, a de-mapping component 1130, a decoding component 1135, a phase noise suppression component 1140, an interference estimation component 1145, a phase noise removal component 1150, an iterative component 1155, and a boosting factor identification module 1160. Each of these modules may communicate, directly or indirectly, with one another (e.g., via one or more buses).

The reception component 1125 may receive, from a transmitting device, a signal including a set of symbols associated with one or more blocks of data.

The de-mapping component 1130 may de-map the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power.

In some cases, a first distance between adjacent symbol points of the first subset of the symbol points is less than a second distance between adjacent symbol points of the second subset of the symbol points, and where the first distance corresponds to a distance between symbol points of the uniform constellation of the modulation order of the first constellation power and the second distance corresponds to a distance between symbol points of the uniform constellation of the modulation order of the second constellation power.

In some cases, a symbol point of the second subset of the symbol points has an in-phase component greater than symbol points of the first subset of the symbol points of a same column of the uniform constellation of the modulation order of the first constellation power and a quadrature component greater than symbol points of the first subset of the symbol points of a same row of the uniform constellation of the modulation order of the first constellation power.

In some cases, a column of the constellation includes a first symbol point of the first subset of the symbol points and a second symbol point of the second subset of the symbol points, the second symbol point having a greater in-phase component than the first symbol point.

In some cases, a row of the constellation includes a first symbol point of the first subset of the symbol points and a second symbol point of the second subset of the symbol points, the second symbol point having a greater quadrature component than the first symbol point.

In some cases, a first distance between adjacent symbol points of the first subset of the symbol points is the same as a second distance between adjacent symbol points of the second subset of the symbol points.

The decoding component 1135 may decode a set of sets of de-mapped data bits to obtain the one or more blocks of data.

The phase noise suppression component 1140 may perform phase noise suppression on the received signal including the set of symbols associated with the one or more blocks of data.

The interference estimation component 1145 may estimate an intercarrier interference (ICI) coefficient for each subcarrier of a set of subcarriers of the received signal.

The phase noise removal component 1150 may remove at least a portion of a phase noise in the received signal based on the estimated ICI coefficient for each subcarrier of the set of subcarriers.

The iterative component 1155 may perform the phase noise suppression includes iteratively performing the de-mapping and performing the phase noise suppression.

The boosting factor identification module 1160 may identify the boosting factor in a lookup table, where de-mapping the set of symbols according to the constellation of symbol points of the modulation order to obtain the set of sets of de-mapped data bits is based on identifying the boosting factor in the lookup table.

Figure 12:
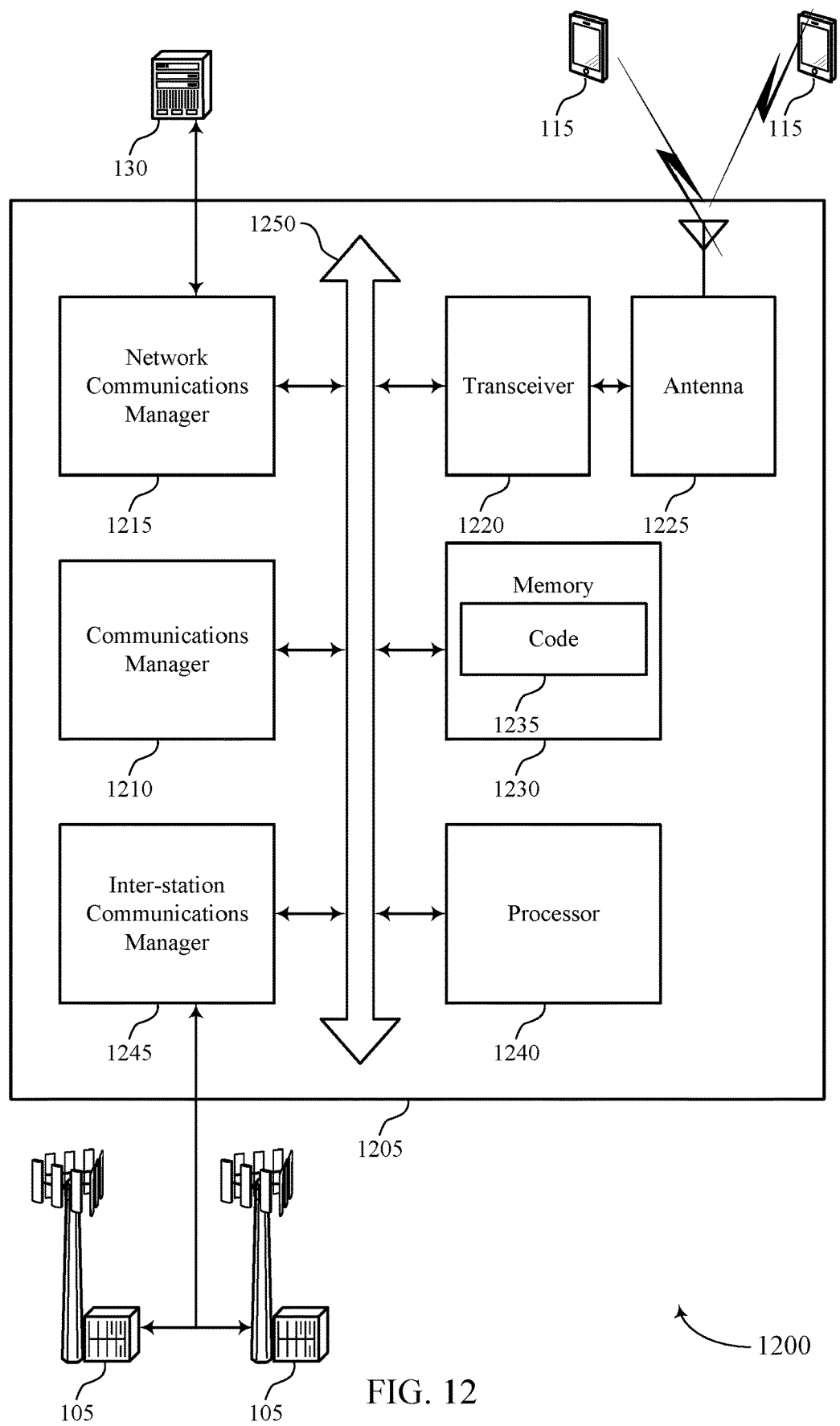
FIG. 12 shows a diagram of a system including a device that supports a data modulation scheme for enhanced phase noise suppression in accordance with aspects of the present disclosure.

FIG. 12 shows a diagram of a system 1200 including a device 1205 that supports a data modulation scheme for enhanced phase noise suppression in accordance with aspects of the present disclosure. The device 1205 may be an example of or include the components of device 1005, device 1105, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a transmitting device, a signal including a set of symbols associated with one or more blocks of data, de-map the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power, and decode a set of sets of de-mapped data bits to obtain the one or more blocks of data.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting a data modulation scheme for enhanced phase noise suppression).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
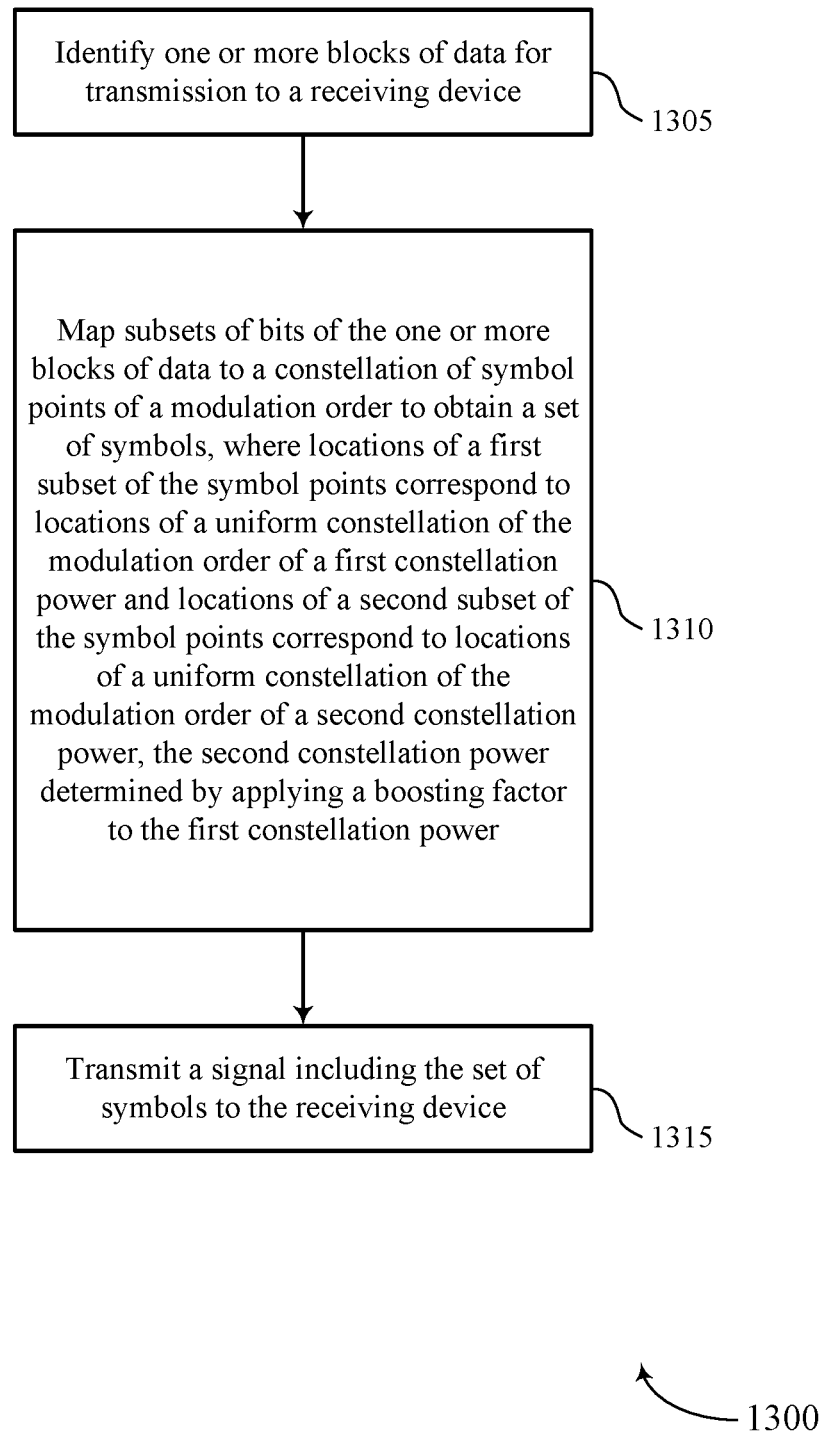
FIGS. 13 through 19 show flowcharts illustrating methods that support a data modulation scheme for enhanced phase noise suppressions in accordance with aspects of the present disclosure.

FIG. 13 shows a flowchart illustrating a method 1300 that supports a data modulation scheme for enhanced phase noise suppression in accordance with aspects of the present disclosure. The operations of method 1300 may be implemented by a UE 115 or its components as described herein. For example, the operations of method 1300 may be performed by a communications manager as described with reference to FIG. 8. In some examples, a UE may execute a set of instructions to control the functional elements of the UE to perform the functions described below. Additionally or alternatively, a UE may perform aspects of the functions described below using special-purpose hardware.

At 1305, the UE may identify one or more blocks of data for transmission to a receiving device. The operations of 1305 may be performed according to the methods described herein. In some examples, aspects of the operations of 1305 may be performed by an identification component as described with reference to FIG. 8.

At 1310, the UE may map subsets of bits of the one or more blocks of data to a constellation of symbol points of a modulation order to obtain a set of symbols, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power. The operations of 1310 may be performed according to the methods described herein. In some examples, aspects of the operations of 1310 may be performed by a bit mapping component as described with reference to FIG. 8.

At 1315, the UE may transmit a signal including the set of symbols to the receiving device. The operations of 1315 may be performed according to the methods described herein. In some examples, aspects of the operations of 1315 may be performed by a signal transmission component as described with reference to FIG. 8.

Figure 14:
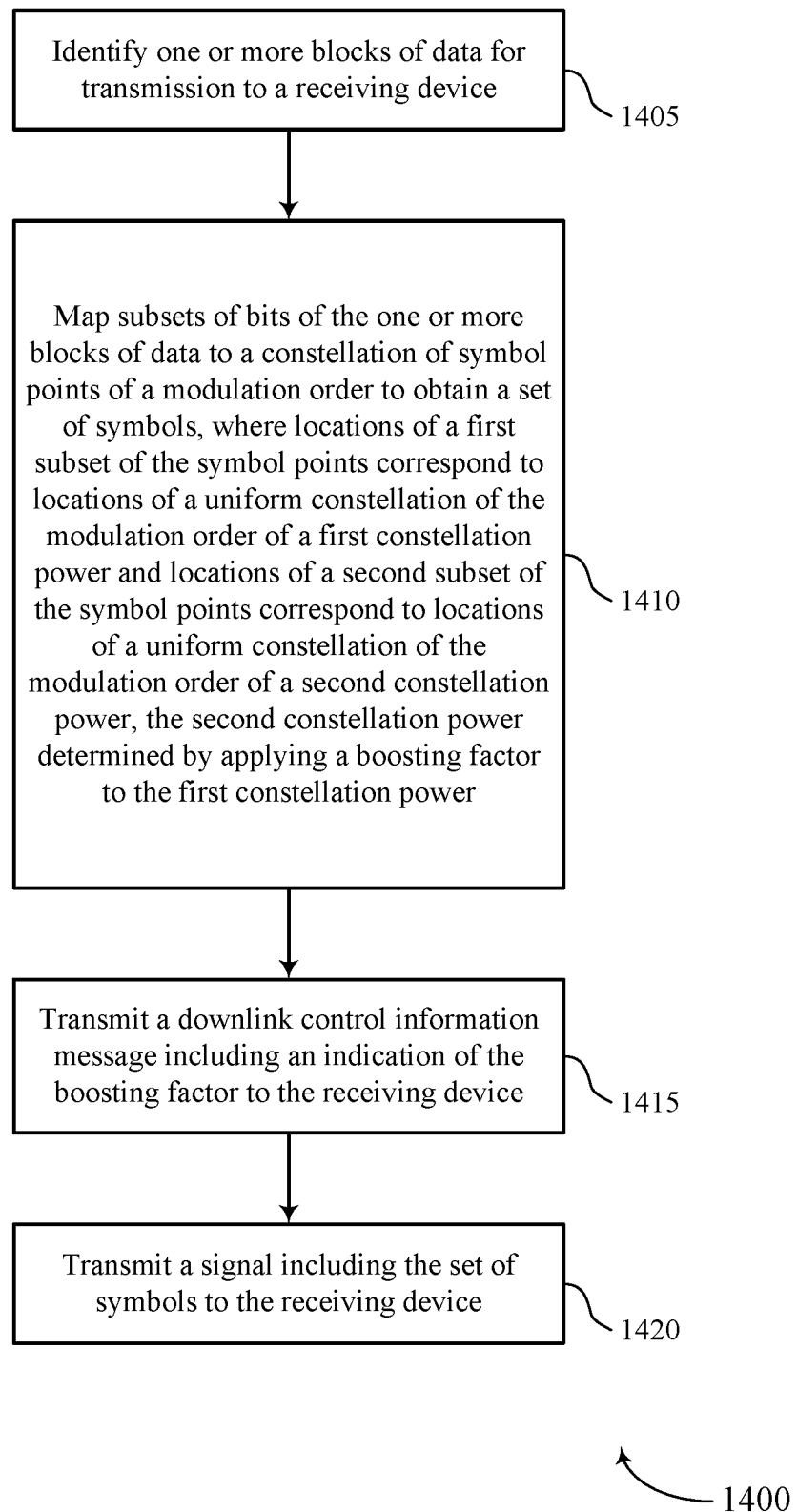

FIG. 14 shows a flowchart illustrating a method 1400 that supports a data modulation scheme for enhanced phase noise suppression in accordance with aspects of the present disclosure. The operations of method 1400 may be implemented by a UE 115 or its components as described herein. For example, the operations of method 1400 may be performed by a communications manager as described with reference to FIG. 8. In some examples, a UE may execute a set of instructions to control the functional elements of the UE to perform the functions described below. Additionally or alternatively, a UE may perform aspects of the functions described below using special-purpose hardware.

At 1405, the UE may identify one or more blocks of data for transmission to a receiving device. The operations of 1405 may be performed according to the methods described herein. In some examples, aspects of the operations of 1405 may be performed by an identification component as described with reference to FIG. 8.

At 1410, the UE may map subsets of bits of the one or more blocks of data to a constellation of symbol points of a modulation order to obtain a set of symbols, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power. The operations of 1410 may be performed according to the methods described herein. In some examples, aspects of the operations of 1410 may be performed by a bit mapping component as described with reference to FIG. 8.

At 1415, the UE may transmit a downlink control information message including an indication of the boosting factor to the receiving device. The operations of 1415 may be performed according to the methods described herein. In some examples, aspects of the operations of 1415 may be performed by a downlink transmission component as described with reference to FIG. 8.

At 1420, the UE may transmit a signal including the set of symbols to the receiving device. The operations of 1420 may be performed according to the methods described herein. In some examples, aspects of the operations of 1420 may be performed by a signal transmission component as described with reference to FIG. 8.

Figure 15:
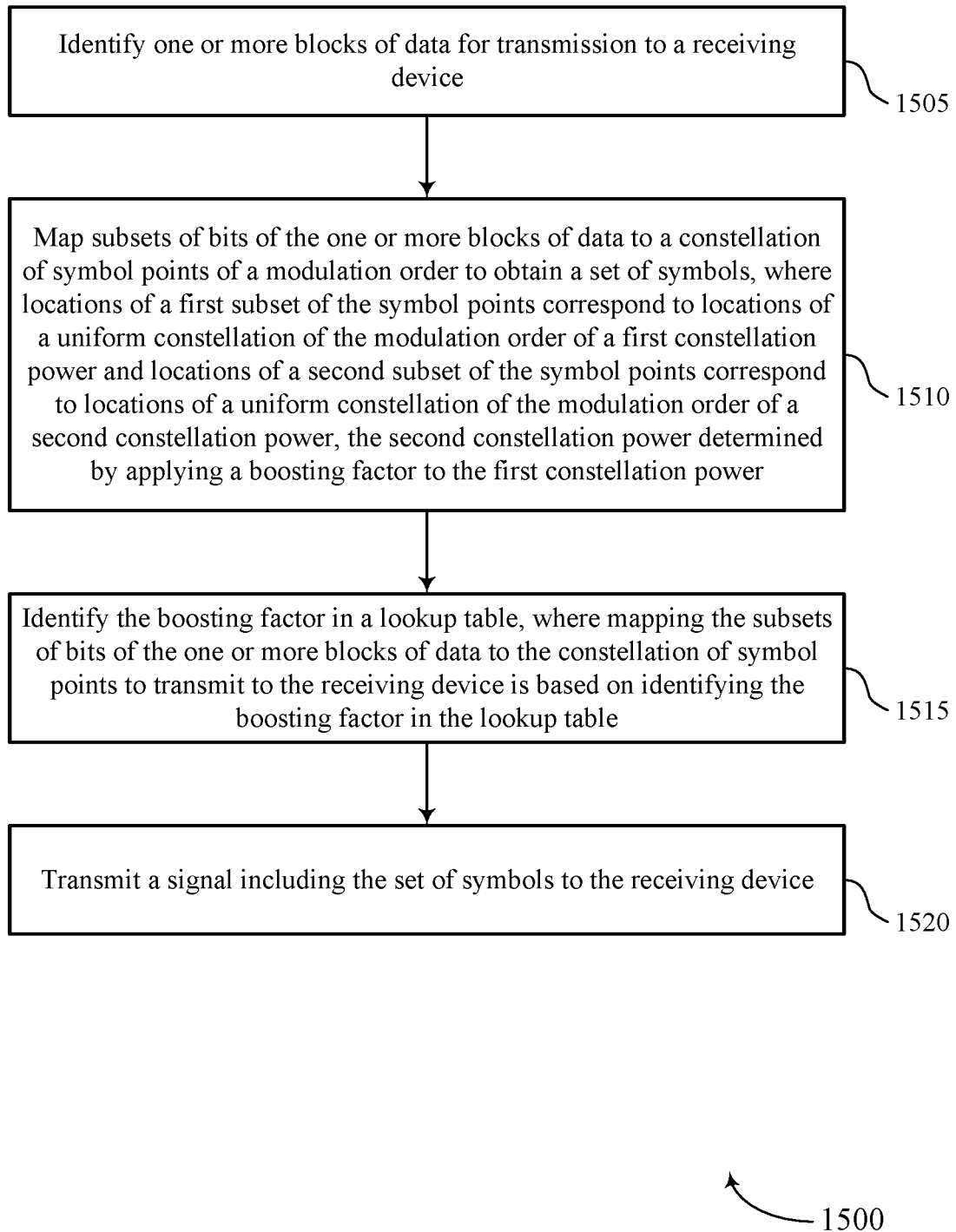

FIG. 15 shows a flowchart illustrating a method 1500 that supports a data modulation scheme for enhanced phase noise suppression in accordance with aspects of the present disclosure. The operations of method 1500 may be implemented by a UE 115 or its components as described herein. For example, the operations of method 1500 may be performed by a communications manager as described with reference to FIG. 8. In some examples, a UE may execute a set of instructions to control the functional elements of the UE to perform the functions described below. Additionally or alternatively, a UE may perform aspects of the functions described below using special-purpose hardware.

At 1505, the UE may identify one or more blocks of data for transmission to a receiving device. The operations of 1505 may be performed according to the methods described herein. In some examples, aspects of the operations of 1505 may be performed by an identification component as described with reference to FIG. 8.

At 1510, the UE may map subsets of bits of the one or more blocks of data to a constellation of symbol points of a modulation order to obtain a set of symbols, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power. The operations of 1510 may be performed according to the methods described herein. In some examples, aspects of the operations of 1510 may be performed by a bit mapping component as described with reference to FIG. 8.

At 1515, the UE may identify the boosting factor in a lookup table, where mapping the subsets of bits of the one or more blocks of data to the constellation of symbol points to transmit to the receiving device is based on identifying the boosting factor in the lookup table. The operations of 1515 may be performed according to the methods described herein. In some examples, aspects of the operations of 1515 may be performed by a boosting factor identification component as described with reference to FIG. 8.

At 1520, the UE may transmit a signal including the set of symbols to the receiving device. The operations of 1520 may be performed according to the methods described herein. In some examples, aspects of the operations of 1520 may be performed by a signal transmission component as described with reference to FIG. 8.

Figure 16:
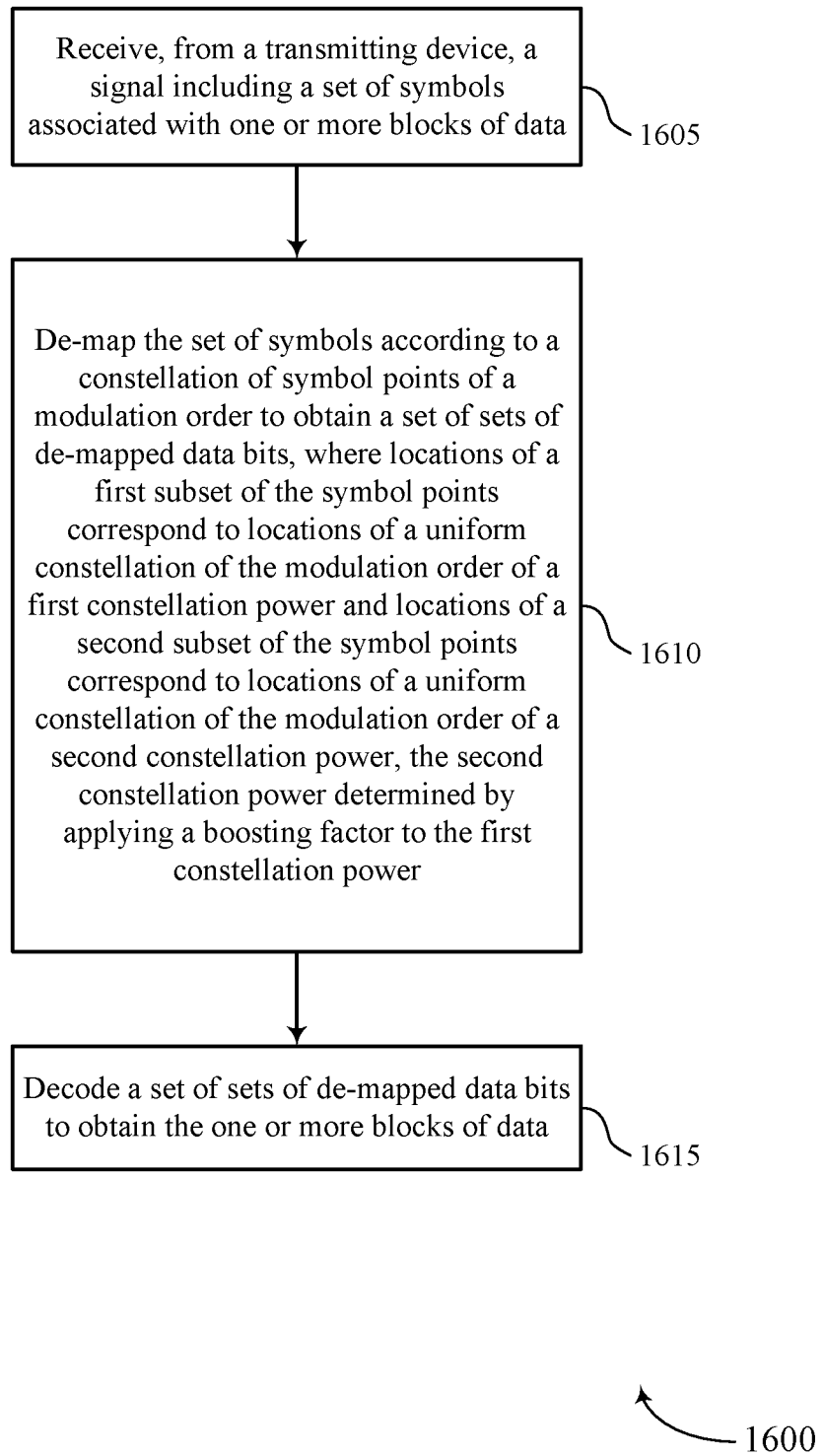

FIG. 16 shows a flowchart illustrating a method 1600 that supports a data modulation scheme for enhanced phase noise suppression in accordance with aspects of the present disclosure. The operations of method 1600 may be implemented by a base station 105 or its components as described herein. For example, the operations of method 1600 may be performed by a communications manager as described with reference to FIG. 11. In some examples, a base station may execute a set of instructions to control the functional elements of the base station to perform the functions described below. Additionally or alternatively, a base station may perform aspects of the functions described below using special-purpose hardware.

At 1605, the base station may receive, from a transmitting device, a signal including a set of symbols associated with one or more blocks of data. The operations of 1605 may be performed according to the methods described herein. In some examples, aspects of the operations of 1605 may be performed by a reception component as described with reference to FIG. 11.

At 1610, the base station may de-map the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power. The operations of 1610 may be performed according to the methods described herein. In some examples, aspects of the operations of 1610 may be performed by a de-mapping component as described with reference to FIG. 11.

At 1615, the base station may decode a set of sets of de-mapped data bits to obtain the one or more blocks of data. The operations of 1615 may be performed according to the methods described herein. In some examples, aspects of the operations of 1615 may be performed by a decoding component as described with reference to FIG. 11.

Figure 17:
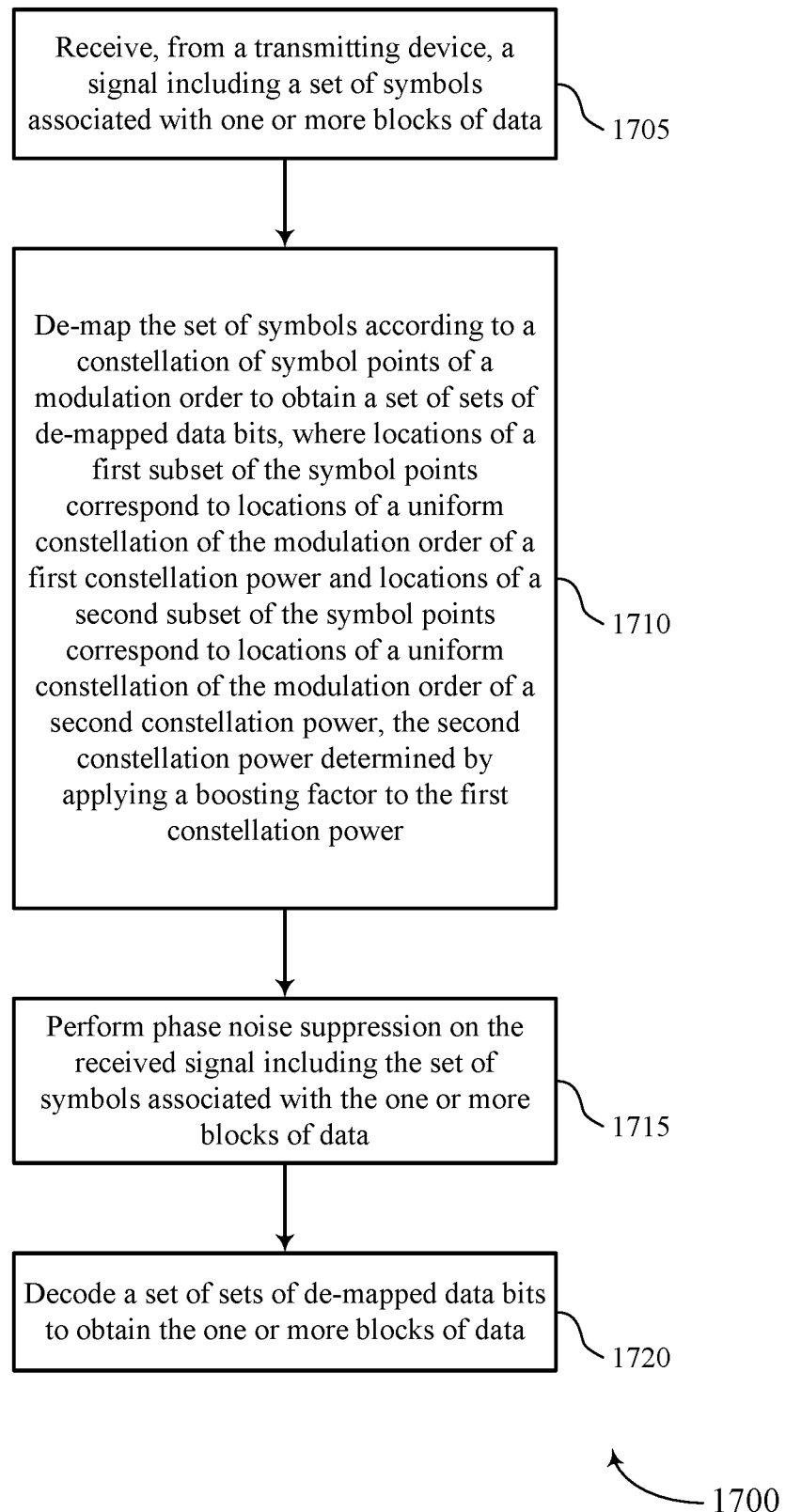

FIG. 17 shows a flowchart illustrating a method 1700 that supports a data modulation scheme for enhanced phase noise suppression in accordance with aspects of the present disclosure. The operations of method 1700 may be implemented by a base station 105 or its components as described herein. For example, the operations of method 1700 may be performed by a communications manager as described with reference to FIG. 11. In some examples, a base station may execute a set of instructions to control the functional elements of the base station to perform the functions described below. Additionally or alternatively, a base station may perform aspects of the functions described below using special-purpose hardware.

At 1705, the base station may receive, from a transmitting device, a signal including a set of symbols associated with one or more blocks of data. The operations of 1705 may be performed according to the methods described herein. In some examples, aspects of the operations of 1705 may be performed by a reception component as described with reference to FIG. 11.

At 1710, the base station may de-map the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power. The operations of 1710 may be performed according to the methods described herein. In some examples, aspects of the operations of 1710 may be performed by a de-mapping component as described with reference to FIG. 11.

At 1715, the base station may perform phase noise suppression on the received signal including the set of symbols associated with the one or more blocks of data. The operations of 1715 may be performed according to the methods described herein. In some examples, aspects of the operations of 1715 may be performed by a phase noise suppression component as described with reference to FIG. 11.

At 1720, the base station may decode a set of sets of de-mapped data bits to obtain the one or more blocks of data. The operations of 1720 may be performed according to the methods described herein. In some examples, aspects of the operations of 1720 may be performed by a decoding component as described with reference to FIG. 11.

Figure 18:
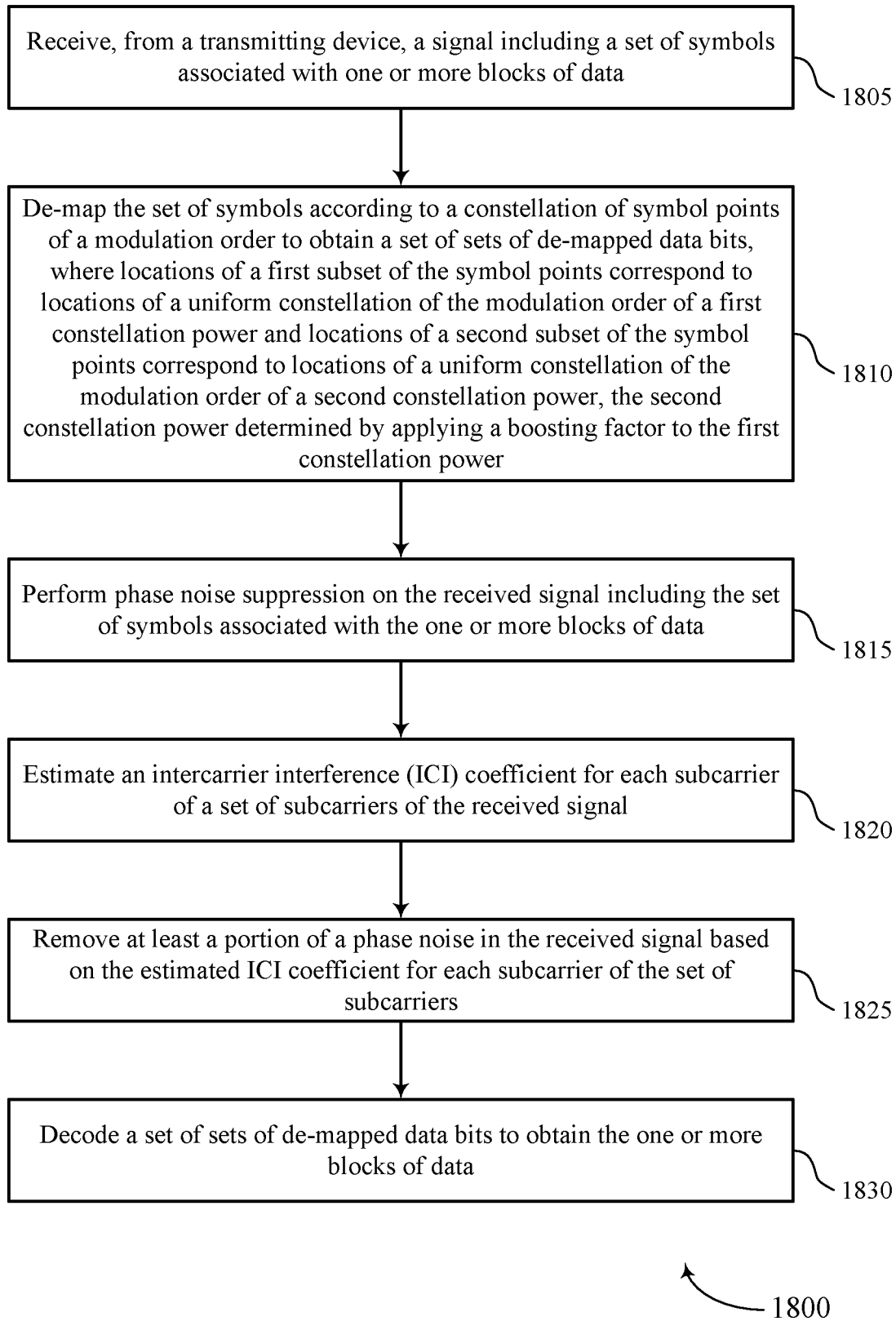

FIG. 18 shows a flowchart illustrating a method 1800 that supports a data modulation scheme for enhanced phase noise suppression in accordance with aspects of the present disclosure. The operations of method 1800 may be implemented by a base station 105 or its components as described herein. For example, the operations of method 1800 may be performed by a communications manager as described with reference to FIG. 11. In some examples, a base station may execute a set of instructions to control the functional elements of the base station to perform the functions described below. Additionally or alternatively, a base station may perform aspects of the functions described below using special-purpose hardware.

At 1805, the base station may receive, from a transmitting device, a signal including a set of symbols associated with one or more blocks of data. The operations of 1805 may be performed according to the methods described herein. In some examples, aspects of the operations of 1805 may be performed by a reception component as described with reference to FIG. 11.

At 1810, the base station may de-map the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power. The operations of 1810 may be performed according to the methods described herein. In some examples, aspects of the operations of 1810 may be performed by a de-mapping component as described with reference to FIG. 11.

At 1815, the base station may perform phase noise suppression on the received signal including the set of symbols associated with the one or more blocks of data. The operations of 1815 may be performed according to the methods described herein. In some examples, aspects of the operations of 1815 may be performed by a phase noise suppression component as described with reference to FIG. 11.

At 1820, the base station may estimate an intercarrier interference (ICI) coefficient for each subcarrier of a set of subcarriers of the received signal. The operations of 1820 may be performed according to the methods described herein. In some examples, aspects of the operations of 1820 may be performed by an interference estimation component as described with reference to FIG. 11.

At 1825, the base station may remove at least a portion of a phase noise in the received signal based on the estimated ICI coefficient for each subcarrier of the set of subcarriers. The operations of 1825 may be performed according to the methods described herein. In some examples, aspects of the operations of 1825 may be performed by a phase noise removal component as described with reference to FIG. 11.

At 1830, the base station may decode a set of sets of de-mapped data bits to obtain the one or more blocks of data. The operations of 1830 may be performed according to the methods described herein. In some examples, aspects of the operations of 1830 may be performed by a decoding component as described with reference to FIG. 11.

Figure 19:
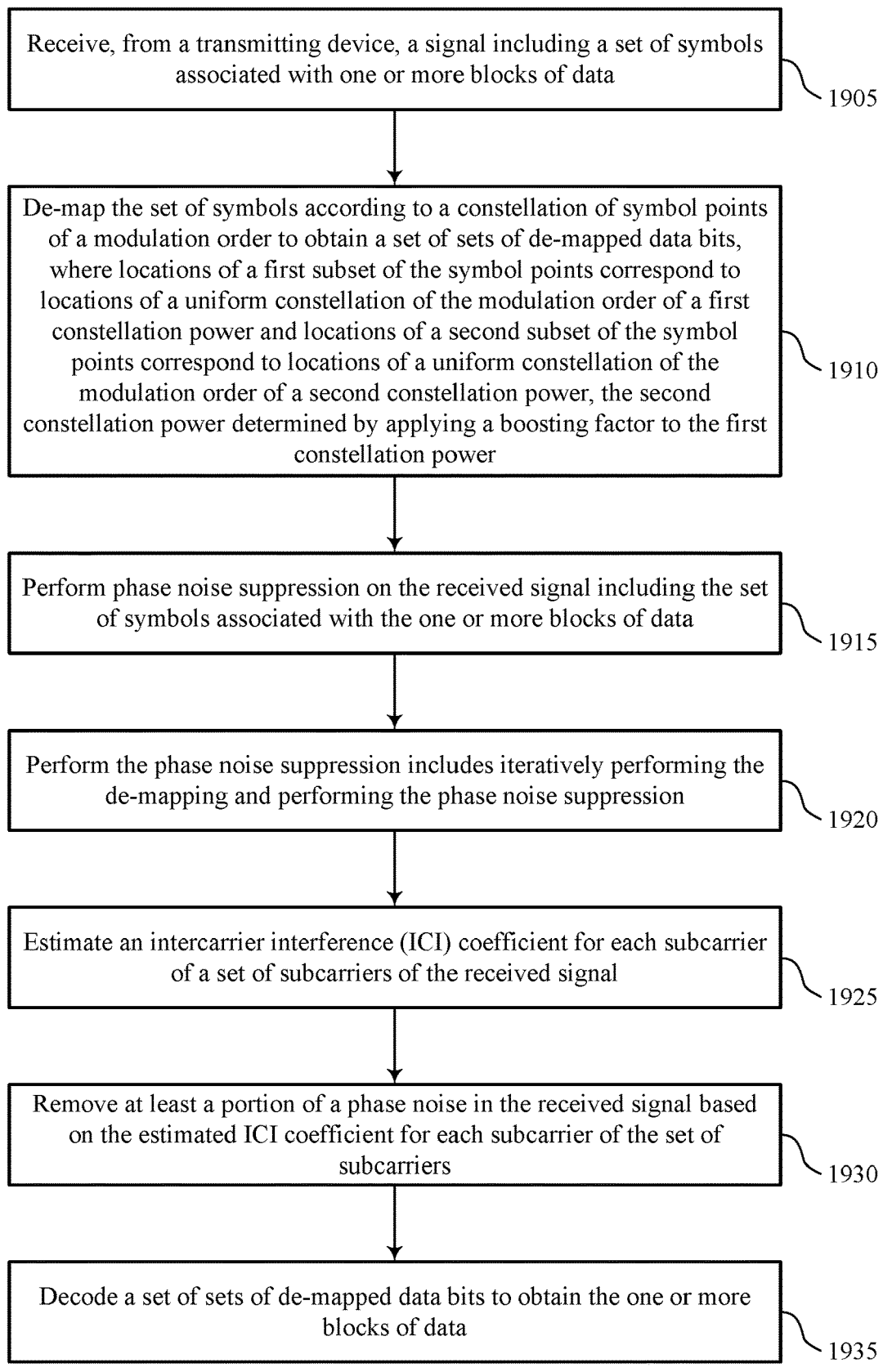

FIG. 19 shows a flowchart illustrating a method 1900 that supports a data modulation scheme for enhanced phase noise suppression in accordance with aspects of the present disclosure. The operations of method 1900 may be implemented by a base station 105 or its components as described herein. For example, the operations of method 1900 may be performed by a communications manager as described with reference to FIG. 11. In some examples, a base station may execute a set of instructions to control the functional elements of the base station to perform the functions described below. Additionally or alternatively, a base station may perform aspects of the functions described below using special-purpose hardware.

At 1905, the base station may receive, from a transmitting device, a signal including a set of symbols associated with one or more blocks of data. The operations of 1905 may be performed according to the methods described herein. In some examples, aspects of the operations of 1905 may be performed by a reception component as described with reference to FIG. 11.

At 1910, the base station may de-map the set of symbols according to a constellation of symbol points of a modulation order to obtain a set of sets of de-mapped data bits, where locations of a first subset of the symbol points correspond to locations of a uniform constellation of the modulation order of a first constellation power and locations of a second subset of the symbol points correspond to locations of a uniform constellation of the modulation order of a second constellation power, the second constellation power determined by applying a boosting factor to the first constellation power. The operations of 1910 may be performed according to the methods described herein. In some examples, aspects of the operations of 1910 may be performed by a de-mapping component as described with reference to FIG. 11.

At 1915, the base station may perform phase noise suppression on the received signal including the set of symbols associated with the one or more blocks of data. The operations of 1915 may be performed according to the methods described herein. In some examples, aspects of the operations of 1915 may be performed by a phase noise suppression component as described with reference to FIG. 11.

At 1920, the base station may perform the phase noise suppression includes iteratively performing the de-mapping and performing the phase noise suppression. The operations of 1920 may be performed according to the methods described herein. In some examples, aspects of the operations of 1920 may be performed by an iterative component as described with reference to FIG. 11.

At 1925, the base station may estimate an intercarrier interference (ICI) coefficient for each subcarrier of a set of subcarriers of the received signal. The operations of 1925 may be performed according to the methods described herein. In some examples, aspects of the operations of 1925 may be performed by an interference estimation component as described with reference to FIG. 11.

At 1930, the base station may remove at least a portion of a phase noise in the received signal based on the estimated ICI coefficient for each subcarrier of the set of subcarriers. The operations of 1930 may be performed according to the methods described herein. In some examples, aspects of the operations of 1930 may be performed by a phase noise removal component as described with reference to FIG. 11.

At 1935, the base station may decode a set of sets of de-mapped data bits to obtain the one or more blocks of data. The operations of 1935 may be performed according to the methods described herein. In some examples, aspects of the operations of 1935 may be performed by a decoding component as described with reference to FIG. 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a transmitting device, comprising:
   identifying one or more blocks of data for transmission to a receiving device;
   mapping subsets of bits of the one or more blocks of data to a constellation of symbol points of a modulation order to obtain a set of symbols, wherein locations of a first subset of the symbol points correspond to locations spanning at least a first plurality of rows of a column of a uniform constellation of the modulation order of a first constellation power and locations of a second subset of the symbol points correspond to locations comprising at least one row of the column of a uniform constellation of the modulation order of a second constellation power, the second constellation power determined by applying a boosting factor to the first constellation power; and
   transmitting a signal comprising the set of symbols to the receiving device.

2. The method of claim 1, wherein a first distance between adjacent symbol points of the first subset of the symbol points is less than a second distance between adjacent symbol points of the second subset of the symbol points, and wherein the first distance corresponds to a distance between symbol points of the uniform constellation of the modulation order of the first constellation power and the second distance corresponds to a distance between symbol points of the uniform constellation of the modulation order of the second constellation power.

3. The method of claim 1, wherein a symbol point of the second subset of the symbol points has an in-phase component greater than symbol points of the first subset of the symbol points of a same column of the uniform constellation of the modulation order of the first constellation power and a quadrature component greater than symbol points of the first subset of the symbol points of a same row of the uniform constellation of the modulation order of the first constellation power.

4. The method of claim 1, wherein a column of the constellation comprises a first symbol point of the first subset of the symbol points and a second symbol point of the second subset of the symbol points, the second symbol point having a greater in-phase component than the first symbol point.

5. The method of claim 1, wherein a row of the constellation comprises a first symbol point of the first subset of the symbol points and a second symbol point of the second subset of the symbol points, the second symbol point having a greater quadrature component than the first symbol point.

6. The method of claim 1, wherein a first distance between adjacent symbol points of the first subset of the symbol points is the same as a second distance between adjacent symbol points of the second subset of the symbol points.

7. The method of claim 1, wherein the second subset of the symbol points comprises at least a portion of a plurality of corners of the constellation of symbol points.

8. The method of claim 1, further comprising:
transmitting a downlink control information message comprising an indication of the boosting factor to the receiving device.

9. The method of claim 1, further comprising:
identifying the boosting factor in a lookup table, wherein mapping the subsets of bits of the one or more blocks of data to the constellation of symbol points to transmit to the receiving device is based at least in part on identifying the boosting factor in the lookup table.

10. The method of claim 1, wherein the boosting factor is one of 1 dB, 2 dB, or 3 dB.

11. A method for wireless communications at a receiving device, comprising:
receiving, from a transmitting device, a signal comprising a set of symbols associated with one or more blocks of data;
de-mapping the set of symbols according to a constellation of symbol points of a modulation order to obtain a plurality of sets of de-mapped data bits, wherein locations of a first subset of the symbol points correspond to locations spanning at least a first plurality of rows of a column of a uniform constellation of the modulation order of a first constellation power and locations of a second subset of the symbol points correspond to locations comprising at least one row of the column of a uniform constellation of the modulation order of a second constellation power, the second constellation power determined by applying a boosting factor to the first constellation power; and
decoding a plurality of sets of de-mapped data bits to obtain the one or more blocks of data.

12. The method of claim 11, further comprising:
performing phase noise suppression on the received signal comprising the set of symbols associated with the one or more blocks of data.

13. The method of claim 12, wherein performing the phase noise suppression comprises:
estimating an intercarrier interference (ICI) coefficient for each subcarrier of a plurality of subcarriers of the received signal; and
removing at least a portion of a phase noise in the received signal based at least in part on the estimated ICI coefficient for each subcarrier of the plurality of subcarriers.

14. The method of claim 13, wherein:
performing the phase noise suppression comprises iteratively performing the de-mapping and performing the phase noise suppression.

15. The method of claim 11, wherein a first distance between adjacent symbol points of the first subset of the symbol points is less than a second distance between adjacent symbol points of the second subset of the symbol points, and wherein the first distance corresponds to a distance between symbol points of the uniform constellation of the modulation order of the first constellation power and the second distance corresponds to a distance between symbol points of the uniform constellation of the modulation order of the second constellation power.

16. The method of claim 11, wherein a symbol point of the second subset of the symbol points has an in-phase component greater than symbol points of the first subset of the symbol points of a same column of the uniform constellation of the modulation order of the first constellation power and a quadrature component greater than symbol points of the first subset of the symbol points of a same row of the uniform constellation of the modulation order of the first constellation power.

17. The method of claim 11, wherein a column of the constellation comprises a first symbol point of the first subset of the symbol points and a second symbol point of the second subset of the symbol points, the second symbol point having a greater in-phase component than the first symbol point.

18. The method of claim 11, wherein a row of the constellation comprises a first symbol point of the first subset of the symbol points and a second symbol point of the second subset of the symbol points, the second symbol point having a greater quadrature component than the first symbol point.

19. The method of claim 11, wherein a first distance between adjacent symbol points of the first subset of the symbol points is the same as a second distance between adjacent symbol points of the second subset of the symbol points.

20. The method of claim 11, further comprising:
identifying the boosting factor in a lookup table, wherein de-mapping the set of symbols according to the constellation of symbol points of the modulation order to obtain the plurality of sets of de-mapped data bits is based at least in part on identifying the boosting factor in the lookup table.

21. An apparatus for wireless communications at a transmitting device, comprising: a processor, memory coupled with the processor; and instructions stored in the memory and executable by the processor to cause the apparatus to:

identify one or more blocks of data for transmission to a receiving device;

map subsets of bits of the one or more blocks of data to a constellation of symbol points of a modulation order to obtain a set of symbols, wherein locations of a first subset of the symbol points correspond to locations spanning at least a first plurality of rows of a column of a uniform constellation of the modulation order of a first constellation power and locations of a second subset of the symbol points correspond to locations comprising at least one row of the column of a uniform constellation of the modulation order of a second constellation power, the second constellation power determined by applying a boosting factor to the first constellation power; and transmit a signal comprising the set of symbols to the receiving device.

22. The apparatus of claim 21, wherein a first distance between adjacent symbol points of the first subset of the symbol points is less than a second distance between adjacent symbol points of the second subset of the symbol points, and wherein the first distance corresponds to a distance between symbol points of the uniform constellation of the modulation order of the first constellation power and the second distance corresponds to a distance between symbol points of the uniform constellation of the modulation order of the second constellation power.

23. The apparatus of claim 21, wherein a first distance between adjacent symbol points of the first subset of the symbol points is the same as a second distance between adjacent symbol points of the second subset of the symbol points.

24. An apparatus for wireless communications at a receiving device, comprising: a processor, memory coupled with the processor; and instructions stored in the memory and executable by the processor to cause the apparatus to:

receive, from a transmitting device, a signal comprising a set of symbols associated with one or more blocks of data;

de-map the set of symbols according to a constellation of symbol points of a modulation order to obtain a plurality of sets of de-mapped data bits, wherein locations of a first subset of the symbol points correspond to locations spanning at least a first plurality of rows of a column of a uniform constellation of the modulation order of a first constellation power and locations of a second subset of the symbol points correspond to locations comprising at least one row of the column of a uniform constellation of the modulation order of a second constellation power, the second constellation power determined by applying a boosting factor to the first constellation power; and decode a plurality of sets of de-mapped data bits to obtain the one or more blocks of data.

25. The apparatus of claim 24, wherein the instructions are further executable by the processor to cause the apparatus to:

perform phase noise suppression on the received signal comprising the set of symbols associated with the one or more blocks of data.

26. The apparatus of claim 25, wherein the instructions to perform the phase noise suppression are executable by the processor to cause the apparatus to:

estimate an intercarrier interference (ICI) coefficient for each subcarrier of a plurality of subcarriers of the received signal; and remove at least a portion of a phase noise in the received signal based at least in part on the estimated ICI coefficient for each subcarrier of the plurality of subcarriers.

27. The apparatus of claim 26, wherein:

perform the phase noise suppression comprises iteratively performing the de-mapping and the performing the phase noise suppression.

28. The apparatus of claim 24, wherein a first distance between adjacent symbol points of the first subset of the symbol points is less than a second distance between adjacent symbol points of the second subset of the symbol points, and wherein the first distance corresponds to a distance between symbol points of the uniform constellation of the modulation order of the first constellation power and the second distance corresponds to a distance between symbol points of the uniform constellation of the modulation order of the second constellation power.

29. The apparatus of claim 24, wherein a first distance between adjacent symbol points of the first subset of the symbol points is the same as a second distance between adjacent symbol points of the second subset of the symbol points.

30. The apparatus of claim 24, wherein the instructions are further executable by the processor to cause the apparatus to:

identify the boosting factor in a lookup table, wherein de-mapping the set of symbols according to the constellation of symbol points of the modulation order to obtain the plurality of sets of de-mapped data bits is based at least in part on identifying the boosting factor in the lookup table.

\* \* \* \* \*